(12) United States Patent
Nakao

(10) Patent No.: US 11,950,724 B2
(45) Date of Patent: Apr. 9, 2024

(54) BEVERAGE PRODUCING APPARATUS

(71) Applicant: New Innovations Inc., Tokyo (JP)

(72) Inventor: Keito Nakao, Tokyo (JP)

(73) Assignee: New Innovations Inc., Tokyo (JP)

(*) Notice: Subject to any disclaimer, the term of this patent is extended or adjusted under 35 U.S.C. 154(b) by 0 days.

(21) Appl. No.: 18/275,374

(22) PCT Filed: Feb. 15, 2022

(86) PCT No.: PCT/JP2022/005833
§ 371 (c)(1),
(2) Date: Aug. 1, 2023

(87) PCT Pub. No.: WO2022/190784
PCT Pub. Date: Sep. 15, 2022

(65) Prior Publication Data
US 2024/0032724 A1 Feb. 1, 2024

(30) Foreign Application Priority Data
Mar. 11, 2021 (JP) .................................. 2021-038845

(51) Int. Cl.
A47J 31/40 (2006.01)
A47J 31/44 (2006.01)
(Continued)

(52) U.S. Cl.
CPC ........... *A47J 31/40* (2013.01); *A47J 31/4407* (2013.01); *A47J 31/52* (2013.01); *A47J 43/046* (2013.01)

(58) Field of Classification Search
CPC ........ A47J 31/368; A47J 31/46; A47J 31/002; A47J 31/36; A47J 31/40; A47J 31/4407; A47J 31/52; A47J 43/046
(Continued)

(56) References Cited

U.S. PATENT DOCUMENTS

2018/0235397 A1* 8/2018 Hachenberger ......... A47J 31/40
2020/0037809 A1 2/2020 Wassink et al.

FOREIGN PATENT DOCUMENTS

JP 2008-187979 A 8/2008
JP 2017-63818 A 4/2017
(Continued)

OTHER PUBLICATIONS

International Search Report issued in PCT/JP2022/005833 dated Apr. 19, 2022 with English Translation (5 pages).
(Continued)

*Primary Examiner* — Phuong T Nguyen
(74) *Attorney, Agent, or Firm* — Nakanishi IP Associates, LLC

(57) ABSTRACT

A beverage producing apparatus includes: a mixer having a stand, a bottle, and a lid; a mixer controller that operates an operation button of the stand; a liquid input part that inputs a liquid; a solid input part that inputs powder or a granule; a lid transfer device that holds the lid in a state in which the lid can be transferred between an above side of the bottle and a position off the above side of the bottle; an operation part that is used to select at least either of a type and an amount of a beverage to be produced by the mixer; and a housing that holds the stand, the liquid input part, the solid input part, the lid transfer device, and the operation part.

20 Claims, 29 Drawing Sheets

(51) Int. Cl.
*A47J 31/52* (2006.01)
*A47J 43/046* (2006.01)

(58) Field of Classification Search
USPC ......... 99/275, 280, 300, 453, 470, 455, 467, 99/485
See application file for complete search history.

(56) References Cited

FOREIGN PATENT DOCUMENTS

| | | | |
|---|---|---|---|
| JP | 2020-500608 | A | 1/2020 |
| JP | 2020-175955 | A | 10/2020 |
| JP | 2020-189645 | A | 11/2020 |
| WO | 2018/101830 | A1 | 6/2018 |
| WO | 2020/047826 | A1 | 3/2020 |

OTHER PUBLICATIONS

Written Opinion of International Searching Authority issued in PCT/JP2022/005833 dated Apr. 19, 2022 with English Translation (5 pages).

* cited by examiner

BEVERAGE PRODUCING APPARATUS

TECHNICAL FIELD

The present invention relates to a beverage producing apparatus.

BACKGROUND ART

Conventionally, a beverage producing apparatus has been proposed as in Patent Literature 1.

CITATION LIST

Patent Literature

Patent Literature 1: JP 2017-63818 A

SUMMARY OF INVENTION

Technical Problem

However, provision of a beverage produced by mixing a plurality of materials is not considered.

Therefore, an object of the present invention is to provide a beverage producing apparatus capable of providing a beverage produced by mixing a plurality of materials.

Solution to Problem

A beverage producing apparatus according to the present invention includes a mixer having a stand, a bottle that is detachably placed on the stand, and a lid that closes an upper portion of the bottle. The beverage producing apparatus includes a mixer controller that operates an operation button of the stand. The beverage producing apparatus includes a liquid input part that inputs a liquid from an above side of the bottle attached to the stand. The beverage producing apparatus includes a solid input part that inputs powder or a granule from an above side of the bottle attached to the stand. The beverage producing apparatus includes a lid transfer device that holds the lid in a state in which the lid can be transferred at least between an above side of the bottle and a position off the above side of the bottle. The beverage producing apparatus includes at least one of an operation part that is used to select at least either of a type and an amount of a beverage to be produced by the mixer, a communication device that receives order information on the beverage to be produced by the mixer, and a reading device that reads said order information. The beverage producing apparatus includes a housing that holds the stand, the liquid input part, the solid input part, the lid transfer device, and at least one of the operation part, the communication device, and the reading device.

In a case where the beverage producing apparatus includes the operation part, input of the liquid to the bottle via the liquid input part, input of the powder or the granule to the bottle via the solid input part, and operation controls of the lid transfer device and the mixer controller are performed on the basis of at least an operation state of the operation part.

In a case where the beverage producing apparatus includes the communication device, input of the liquid to the bottle via the liquid input part, input of the powder or the granule to the bottle via the solid input part, and operation controls of the lid transfer device and the mixer controller are performed on the basis of at least said order information received by the communication device.

In a case where the beverage producing apparatus includes the reading device, input of the liquid to the bottle via the liquid input part, input of the powder or the granule to the bottle via the solid input part, and operation controls of the lid transfer device and the mixer controller are performed on the basis of at least said order information read by the reading device.

When a user simply places the bottle on the stand, operates the operation part, and the like, operation control, such as input of a liquid and the like to be materials of a beverage to be produced to the bottle, is performed, and it is possible to provide a beverage produced by mixing a plurality of the materials.

Preferably, the solid input part has a granule input part that inputs the granule.

The granule input part has a granule transfer spiral part that transfers the granule by rotation of a spiral portion, and a granule transfer power providing part that supplies a rotational force to the granule transfer spiral part.

When a load for rotating the granule transfer spiral part exceeds a predetermined amount, the granule transfer power providing part stops, rotates reversely, and rotates forward.

When the load is large, it stops, rotates reversely, and then rotates forward again, so that it is possible to prevent the granule from being caught by the granule transfer spiral part and the like and being pulverized.

More preferably, the solid input part has a powder input part that inputs the powder.

The powder input part has a powder transfer spiral part that transfers the powder by rotation of a spiral portion, a powder transfer power providing part that supplies a rotational force to the powder transfer spiral part, and a powder stirring part including an elastic member and an arm part extending from the elastic member.

The elastic member comes into contact with the spiral portion of the powder transfer spiral part by being biased, a contact place between the elastic member and the spiral portion of the powder transfer spiral part is displaced by the rotation of the spiral portion of the powder transfer spiral part, and the elastic member and the arm part stir the powder.

When the elastic member is lifted up and when it returns to a position where it comes into contact with the spiral portion of the powder transfer spiral part, the elastic member and the arm part extending from the elastic member stir the powder around them.

Even more preferably, a contact part made of an elastic body is provided in the powder transfer power providing part.

A recess, into which an end portion of a rotation shaft of the powder transfer spiral part is fitted, is provided in the contact part.

Even in a state in which the fitting between the powder transfer power providing part and the powder transfer spiral part is not tightly created, a state of being fitted to each other can be created by rotating the powder transfer power providing part. In addition, even in a state in which the fitting is not created, the contact part is only elastically deformed and is not damaged because the contact part is made of an elastic body. Therefore, the powder transfer power providing part and the powder transfer spiral part can be easily coupled.

Preferably, the solid input part has a transfer spiral part that transfers the granule or the powder by rotation of a spiral portion, and a transfer power providing part that supplies a rotational force to the transfer spiral part.

The beverage producing apparatus includes a controller and a recorder that records, per unit weight, a rotation amount of the transfer power providing part.

By rotating the transfer power providing part by a rotation amount corresponding to the unit weight, the controller adjusts the rotation amount on the basis of a ratio of the weight of the discharged granule or powder to the unit weight.

It is possible to adjust the amount of the powder to be discharged from the solid input part depending on an individual difference of the solid input part or the like.

Even more preferably, the controller adjusts the rotation amount on the basis of information on at least one of an amount of the granule or the powder contained in the solid input part, air temperature, and humidity.

It is possible to finely adjust the amount of the powder to be discharged from the solid input part depending on the surrounding conditions or the like.

Preferably, the beverage producing apparatus further includes a transmission part.

The mixer controller has a control button.

The transmission part presses the operation button on the basis of a force applied from the control button.

A direction, in which the control button presses the transmission part, is a vertical direction.

A direction, in which the transmission part presses the operation button, is a horizontal direction.

The transmission part converts a force for pushing in a different direction (vertical direction) into a force for pushing in the horizontal direction.

Therefore, the dimension, in the direction (horizontal direction) in which the operation button of the beverage producing apparatus is pressed, can be made smaller than that in a form in which the transmission part is not provided.

Even more preferably, the transmission part has a lever.

The lever includes a region extending in the horizontal direction and a region extending in the vertical direction.

The region extending in the horizontal direction has a region that faces the control button and functions as a point of force.

The region extending in the vertical direction has a region that faces the operation button and functions as a point of action.

A connection point between the region extending in the horizontal direction and the region extending in the vertical direction functions as a fulcrum.

A distance between the region functioning as a point of force and the region functioning as a fulcrum is larger than a distance between the region functioning as a point of action and the region functioning as a fulcrum.

The lever of the transmission part enables the operation button to be pressed down with a less force.

Preferably, the beverage producing apparatus further includes the reading device.

The reading device reads a barcode including the order information.

By reading the order information, such as a type of a beverage to be produced next, from the barcode or the like output from external equipment such as a register, it is possible for an error, in setting the beverage to be produced next by the beverage producing apparatus, to hardly occur.

Preferably, two or more sets of the stands, the mixer controllers, and the lid transfer devices are provided.

One or more sets of the liquid input parts and the solid input parts are provided.

It is possible to perform cooking (pulverization or stirring) in the bottle placed on one stand while inputting the liquid and the like to the bottle placed on the other stand.

Preferably, the liquid input part and the solid input part are disposed such that a tip portion of a nozzle of the liquid input part, a discharge port for the powder of the solid input part, and a discharge port for the granule of the solid input part face one region.

A transfer device is provided, the transfer device transferring the liquid input part and the solid input part in a state in which switching can be performed between a state in which said one region is positioned on an above side of the stand and a state in which said one region is positioned off the above side of the stand.

By transferring the transfer device such that said one region is positioned on the above side of the stand that holds the bottle to which the liquid and the like are to be input, it is possible to simultaneously input the liquid and the solid (powder and granule) to the bottle.

Preferably, the lid transfer device includes a plurality of suction devices that hold the lid.

The lid can be held by using, of the plurality of suction devices, one or more suction devices, not all of them.

Even if the lid is wet and some of the plurality of suction devices cannot sufficiently perform suction, it is possible to maintain the holding of the lid by the other suction devices.

Preferably, the beverage producing apparatus further includes: a liquid input part transfer device that holds the liquid input part in a state in which a liquid discharge port, from which the liquid is discharged, of the liquid input part can be transferred at least between an above side of the bottle and a position off the above side of the bottle; and a solid input part transfer device that holds the solid input part in a state in which a solid discharge port, from which the powder or the granule is discharged, of the solid input part can be transferred at least between an above side of the bottle and a position off the above side of the bottle.

With the transfer devices (the lid transfer device, the liquid input part transfer device, the solid input part transfer device), it is possible to replace the members (the lid, the liquid input part, the solid input part) that are positioned on the above side of the bottle and to effectively use a space on the above side of the bottle.

Even more preferably, the beverage producing apparatus includes a waste liquid container.

When cleaning water is caused to flow through the liquid input part, the liquid input part transfer device positions the liquid discharge port on an above side of the waste liquid container.

Preferably, the solid input part has a shooter that holds the powder or the granule, and a holding part.

The holding part can be transferred between a first position and a second position.

When positioned at the first position, the holding part receives supply of the powder or the granule from the shooter, and when positioned at the second position, the holding part discharges the powder or the granule for inputting to the bottle.

It is possible to input a predetermined amount of the powder or the granule to the bottle.

In a case where the beverage producing apparatus includes the communication device, the operation part preferably outputs information on a beverage to be produced next on the basis of at least the order information received by the communication device. In a case where the beverage producing apparatus includes the reading device, the operation part preferably outputs information on a beverage to be produced next on the basis of at least the order information read by the reading device.

It is easy for a user to operate the operation part of the beverage producing apparatus according to the order of the orders received via external equipment such as a register.

Preferably, the beverage producing apparatus further includes a sensor that acquires information on at least either of a type and an amount of a material input to the bottle.

Information on whether the type and amount of the beverage that can be produced from the type and amount, which are specified on the basis of the information acquired by the sensor, of the material input to the bottle and the type and amount of the beverage selected via the operation part match is output.

It is possible to notify a user or the like of whether the materials manually input to the bottle by the user are correct corresponding to the type and amount of the beverage selected via the operation part.

It is also possible to notify a user or the like of whether the liquid input via the liquid input part and the powder or the granules input via the solid input part are correct corresponding to the type and amount of the beverage selected via the operation part.

Preferably, the beverage producing apparatus further includes a bottle transfer device that holds the bottle in a state in which the bottle can be transferred at least among an under side of the liquid discharge port, from which the liquid is discharged, of the liquid input part, an under side of the solid discharge port, from which the powder or the granule is discharged, of the solid input part, and an above side of the stand.

Even more preferably, the beverage producing apparatus includes a liquid container that stores the liquid, and a liquid feeding pump that is attached to the liquid container and discharges the liquid in the liquid container by being pressed down at an upper end portion.

A tip portion of the liquid feeding pump functions as the liquid input part.

The beverage producing apparatus presses down the upper end portion of the liquid feeding pump in a state in which the bottle is positioned on the under side of the liquid discharge port.

Even more preferably, the lid transfer device includes a lid holding part having a groove-shaped cross section.

The groove shape of the lid holding part includes an upper surface, a lower surface, and a connection surface connecting the upper surface and the lower surface.

The upper surface is positioned above the lower surface in a state in which the lid is positioned on an above side of the bottle.

A width, in a direction extending from the connection surface, of the upper surface is larger than a width, in a direction extending from the connection surface, of the lower surface.

A beverage producing apparatus according to the present invention includes: a mixer having a stand, a bottle that is detachably placed on the stand, and a lid that closes an upper portion of the bottle; a mixer controller that operates an operation button of the stand; a liquid input part that inputs a liquid from an above side of the bottle attached to the stand; a solid input part that inputs powder or a granule from an above side of the bottle attached to the stand; a lid transfer device that holds the lid in a state in which the lid can be transferred at least between an above side of the bottle and a position off the above side of the bottle; an operation part that is used to select at least either of a type and an amount of a beverage to be produced by the mixer; and a housing that holds the stand, the liquid input part, the solid input part, the lid transfer device, and the operation part.

On the basis of an operation state of the operation part, input of the liquid to the bottle via the liquid input part, input of the powder or the granule to the bottle via the solid input part, and operation controls of the lid transfer device and the mixer controller are performed.

A beverage producing apparatus according to the present invention includes a mixer having a stand, a bottle that is detachably placed on the stand, and a lid that closes an upper portion of the bottle. The beverage producing apparatus includes a mixer controller that operates an operation button of the stand. The beverage producing apparatus includes a liquid input part that inputs a liquid from an above side of the bottle attached to the stand. The beverage producing apparatus includes a solid input part that inputs powder or a granule from an above side of the bottle attached to the stand. The beverage producing apparatus includes a lid transfer device that holds the lid in a state in which the lid can be transferred at least between an above side of the bottle and a position off the above side of the bottle. The beverage producing apparatus includes at least one of an operation part that is used to select at least either of a type and an amount of a beverage to be produced by the mixer, a communication device that receives order information on a beverage to be produced by the mixer, and a reading device that reads the order information. The beverage producing apparatus includes a housing that holds the stand, the liquid input part, the solid input part, the lid transfer device, and at least one of the operation part, the communication device, and the reading device.

A beverage producing method using said beverage producing apparatus executes at least one of an operating step of operating the operation part, a receiving step of receiving the order information by the communication device, and a reading step of reading the order information by the reading device. The beverage producing method executes an input step in which, on the basis of at least one of an operation state of the operation part, the order information received by the communication device, and the order information read by the reading device, at least either of input of the liquid to the bottle via the liquid input part and input of the powder or the granule to the bottle via the solid input part is performed. The beverage producing method executes, after the input step, a lid closing step in which the lid transfer device positions the lid on the above side of the bottle. The beverage producing method executes, after the lid closing step, a stand operating step in which the mixer controller operates an operation button of the stand, the operation button corresponding to at least one of the operation state of the operation part, the order information received by the communication device, and the order information read by the reading device.

Preferably, the beverage producing apparatus includes a liquid input part transfer device that transfers the liquid input part.

The beverage producing method executes: after at least one of the operating step, the receiving step, and the reading step and before the input step, a lid retreat step in which the lid transfer device transfers the lid to a position off the above side of the bottle; and, after the input step and before the lid closing step, a liquid input part retreat step in which the liquid input part transfer device transfers the liquid input part to a position off the abode side of the bottle.

Preferably, the beverage producing apparatus further includes a bottle transfer device that transfers the bottle.

The beverage producing method executes: after at least one of the operating step, the receiving step, and the reading step and before the input step, a lid retreat step in which the lid transfer device transfers the lid to a position off the above side of the bottle; and, after the input step and before the lid closing step, a bottle transfer step in which the bottle transfer device positions the bottle on the above side of the stand.

Advantageous Effects of Invention

According to the present invention, it is possible to provide a beverage producing apparatus capable of providing a beverage produced by mixing a plurality of materials, as described above.

DESCRIPTION OF EMBODIMENTS

Hereinafter, a first embodiment will be described with reference to the drawings (see FIG. 1 to FIG. 7).

Note that the embodiments are not limited to the following embodiments. In addition, the contents described in one embodiment are similarly applied to the other embodiments in principle. In addition, each embodiment and each modification can be appropriately combined.

Figure 1:
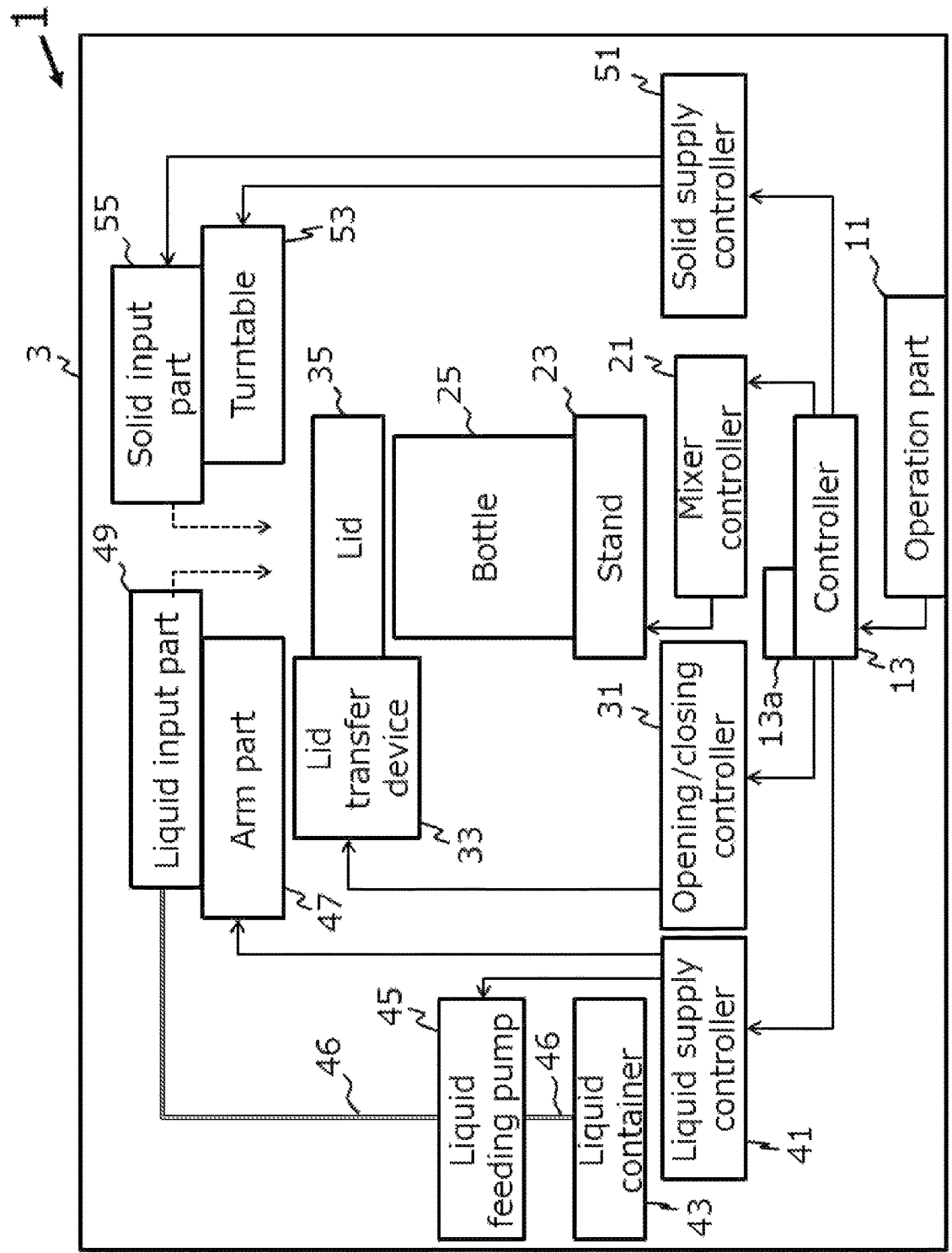
FIG. 1 is a configuration view illustrating respective members of a beverage producing apparatus according to a first embodiment.

A beverage producing apparatus 1 according to the first embodiment includes a housing 3, an operation part 11, a controller 13, a mixer controller 21, a stand 23, a bottle 25, an opening/closing controller 31, a lid transfer device 33, a lid 35, a liquid supply controller 41, a liquid container 43, a liquid feeding pump 45, a liquid feeding tube 46, a liquid input part transfer device 47, a liquid input part 49, a solid supply controller 51, a solid input part transfer device 53, and a solid input part 55 (see FIG. 1).

The stand 23, the bottle 25, and the lid 35 constitute a mixer that pulverizes and stirs the materials input to the bottle 25 to produce a predetermined beverage.

In FIG. 4 to FIG. 7, illustration of the side wall of the housing 3 is omitted for describing the internal structure of the beverage producing apparatus 1.

(Housing 3)

The housing 3 houses the operation part 11, the controller 13, the mixer controller 21, the stand 23, the bottle 25, the opening/closing controller 31, the lid transfer device 33, the lid 35, the liquid supply controller 41, the liquid container 43, the liquid feeding pump 45, the liquid feeding tube 46, the liquid input part transfer device 47, the liquid input part 49, the solid supply controller 51, the solid input part transfer device 53, and the solid input part 55.

An opening/closing door (first door 3a) for taking in and out the bottle 25 and the lid 35 is provided in the side surface (e.g., front surface) of the housing 3.

The liquid container 43 and the solid input part 55 may be taken in and out via said opening/closing door in order to replenish the content (liquid) of the liquid container 43 and replenish the contents (solid, powder) of the solid input part 55.

However, the liquid container 43 and the solid input part 55 may be taken in and out via other opening/closing doors (second door 3b, third door 3c) provided in the housing 3.

Figure 2:
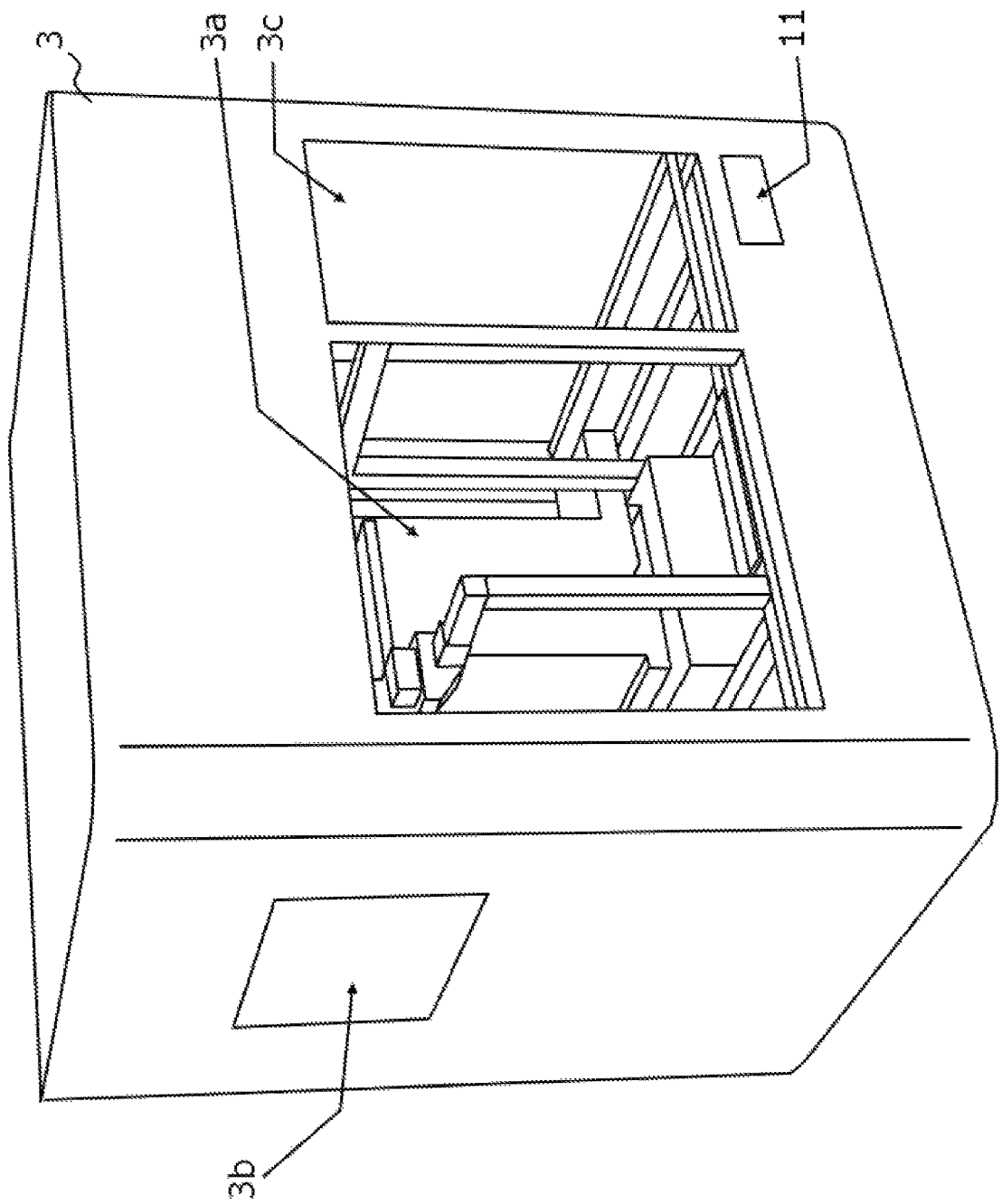
FIG. 2 is a perspective view illustrating an appearance of the beverage producing apparatus according to the first embodiment.

The positions of the first door 3a for taking in and out the bottle 25 and the lid 35, the second door 3b for taking in and out the liquid container 43 and the like, and the third door 3c for taking in and out the solid input part 55 and the like are not limited to those in FIG. 2.

Alternatively, one door may serve as two or three of the first door 3a, the second door 3b, and the third door 3c.

FIG. 2 illustrates an example in which the first door 3a and the third door 3c are made of transparent plates, and the second door 3b is made of a non-transparent plate.

(Operation Part 11)

The operation part 11 is used to select at least either of a type and a volume of a beverage to be produced by the beverage producing apparatus 1.

The operation part 11 is provided on the side surface (e.g., front surface) of the housing 3.

The operation part 11 has a plurality of selection buttons.

Figure 3:
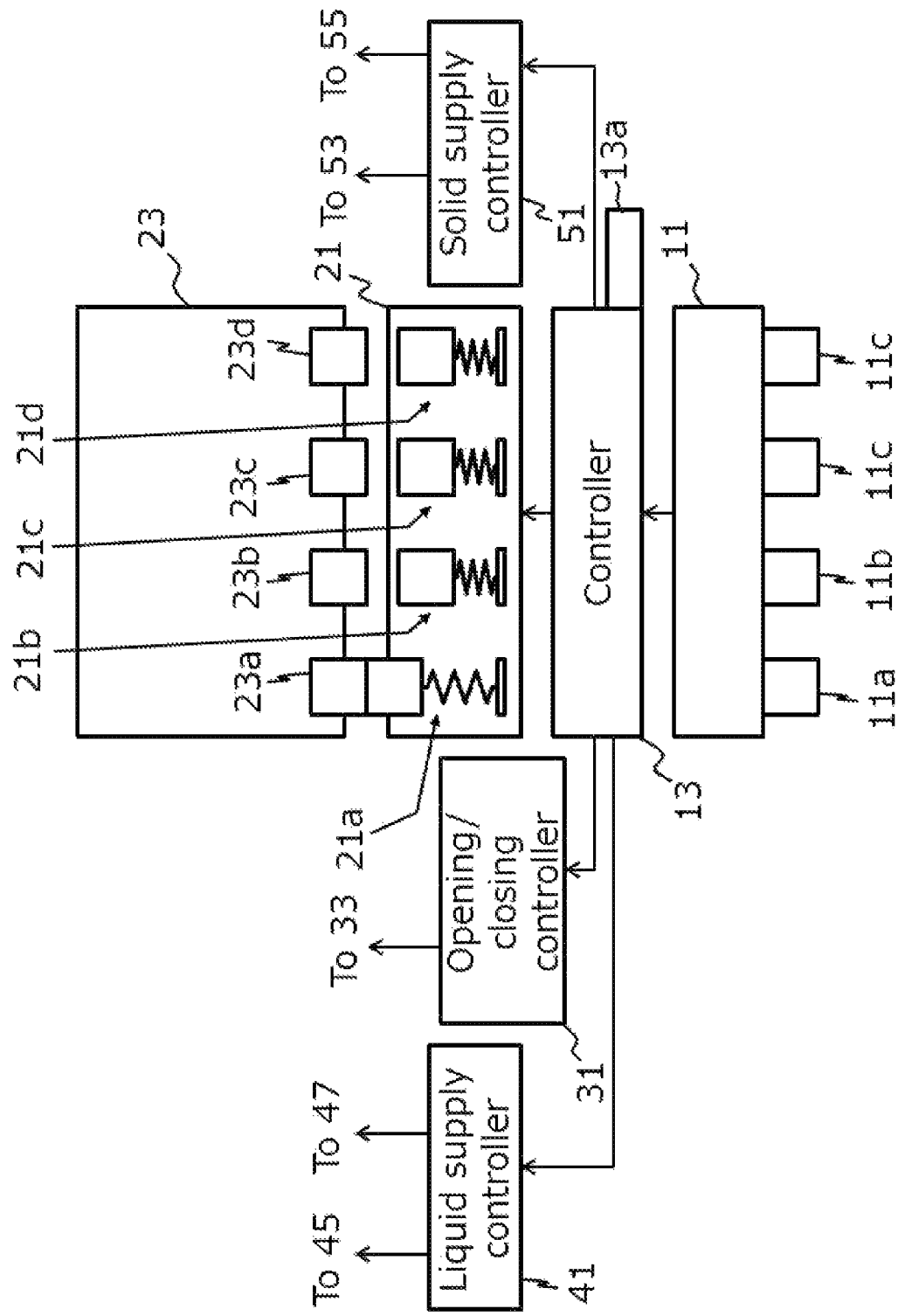
FIG. 3 is a view illustrating configurations of a stand, a mixer controller, and a controller according to the first embodiment.

In the first embodiment, the operation part 11 has a first button 11a, a second button 11b, a third button 11c, and a fourth button 11d as the plurality of selection buttons (see FIG. 3).

However, the first button 11a to the fourth button 11d of the operation part 11 may be configured by a touch panel on a display device.

(Controller 13)

The controller 13 controls the mixer controller 21, the opening/closing controller 31, the liquid supply controller 41, and the solid supply controller 51 depending on an operation state of the operation part 11. That is, the controller 13 transmits control signals to the mixer controller 21, the opening/closing controller 31, the liquid supply controller 41, and the solid supply controller 51. In addition, a recording device (recorder) 13a is provided in the controller 13.

The recording device 13a records information on the type and amount of a material corresponding to the beverage to be produced. In the first embodiment, the recording device 13a records, for example, information on the types and amounts of a liquid and a solid for producing a large volume of a first beverage, information on the types and amounts of the liquid and the solid for producing a small volume of the first beverage, information on the types and amounts of a liquid and a solid for producing a large volume of a second beverage, and information on the types and amounts of the liquid and the solid for producing a small volume of the second beverage.

Therefore, even in a state in which communication with external equipment is interrupted, it is possible to produce the first beverage or the like on the basis of the information recorded therein.

These information may be downloaded from an external server via a network, or may be manually set via the operation part 11 or the like. Alternatively, information on the types and amounts of a liquid and a solid for producing a beverage that is not recorded in the recording device 13a may be manually set via the operation part 11 or the like.

When the first button 11a is operated, the controller 13 performs operation control for producing a large volume of the first beverage on the basis of the information recorded in the recording device 13a.

When the second button 11b is operated, the controller 13 performs operation control for producing a small volume of the first beverage on the basis of the information recorded in the recording device 13a.

When the third button 11c is operated, the controller 13 performs operation control for producing a large volume of the second beverage on the basis of the information recorded in the recording device 13a.

When the fourth button 11d is operated, the controller 13 performs operation control for producing a small volume of the second beverage on the basis of the information recorded in the recording device 13a.

Note that the number of the buttons of the operation part 11 is not limited to this.

For example, a button for producing a large volume of a first beverage containing a larger amount of a specific raw material (e.g., syrup); a button for producing a small volume of a second beverage containing a smaller amount of a specific raw material (e.g., milk); and the like may be provided.

In the first embodiment, an example is described in which the controller 13 includes, as separate bodies, the mixer controller 21, the opening/closing controller 31, the liquid supply controller 41, and the solid supply controller 51. However, one controller 13 may be integrated with at least one of the mixer controller 21, the opening/closing controller 31, the liquid supply controller 41, and the solid supply controller 51.

(Mixer Controller 21)

The mixer controller 21 controls an operation of the stand 23 on the basis of a control signal from the controller 13.

Specifically, the mixer controller 21 has control buttons (a first control button 21a to a fourth control button 21d) for operating operation buttons (a first operation button 23a to a fourth operation button 23d) of the stand 23 depending on the operation state of the operation part 11.

When the first button 11a is operated, the first control button 21a is driven to press down the first operation button 23a of the stand 23.

When the second button 11b is operated, the second control button 21b is driven to press down the second operation button 23b of the stand 23.

When the third button 11c is operated, the third control button 21c is driven to press down the third operation button 23c of the stand 23.

When the fourth button 11d is operated, the fourth control button 21d is driven to press down the fourth operation button 23d of the stand 23.

(Stand 23)

The stand 23 detachably holds the bottle 25.

The stand 23 has a built-in motor, and rotates a cutter inside the bottle 25 by a rotational force of said motor.

The stand 23 has the operation buttons (the first operation button 23a to the fourth operation button 23d) for selecting a rotation speed and a cooking time corresponding to a beverage to be produced.

In the first embodiment, the first operation button 23a corresponds to a rotation speed and a cooking time for producing a large volume of the first beverage.

The second operation button 23b corresponds to a rotation speed and a cooking time for producing a small volume of the first beverage.

The third operation button 23c corresponds to a rotation speed and a cooking time for producing a large volume of the second beverage.

The fourth operation button 23d corresponds to a rotation speed and a cooking time for producing a small volume of the second beverage.

In the first embodiment, an example has been described in which the first operation button 23a corresponds to the first button 11a, the second operation button 23b corresponds to the second button lib, the third operation button 23c corresponds to the third button 11c, and the fourth operation button 23d corresponds to the fourth button lid.

However, when a rotation speed of the motor and a cooking time are common between the first beverage and the second beverage, one of the operation buttons of the stand 23 may correspond to a plurality of the buttons of the operation part 11. A form can be considered in which, for example, the first operation button 23a corresponds to the first button 11a and the third button 11c, and the second operation button 23b corresponds to the second button 11b and the fourth button lid.

(Bottle 25)

The bottle 25 has a built-in cutter.

When the bottle 25 is placed on the stand 23 and any one of the first operation button 23a to the fourth operation button 23d is operated, the rotational force of the motor of the stand 23 is transmitted to the cutter of the bottle 25. With the rotation of said cutter, the ingredients (materials) inside the bottle 25 are pulverized or stirred.

(Opening/Closing Controller 31)

The opening/closing controller 31 controls an operation of the lid transfer device 33 on the basis of a control signal from the controller 13.

Figure 4:
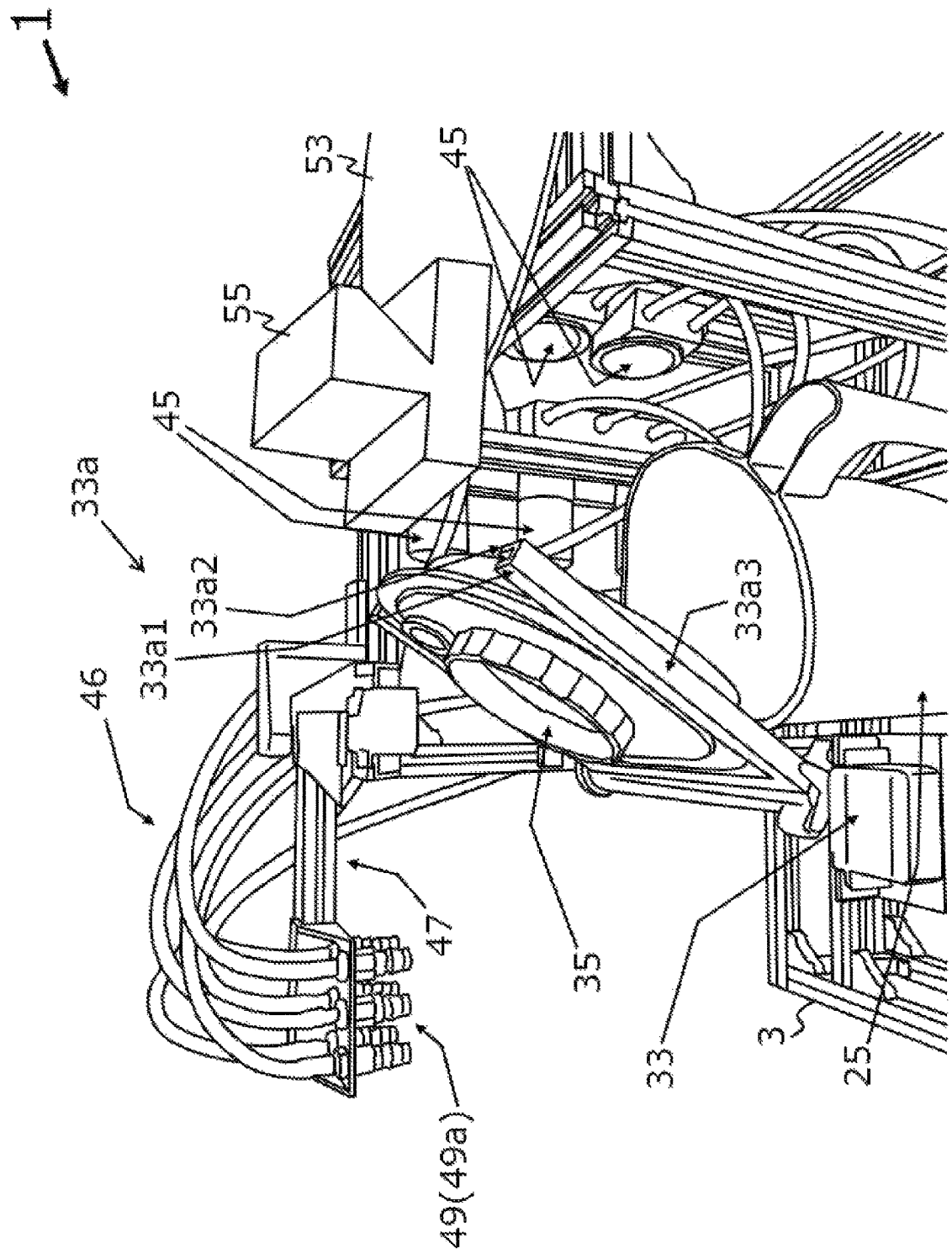
FIG. 4 is a perspective view illustrating a lid retreat step in the beverage producing apparatus according to the first embodiment.
Figure 5:
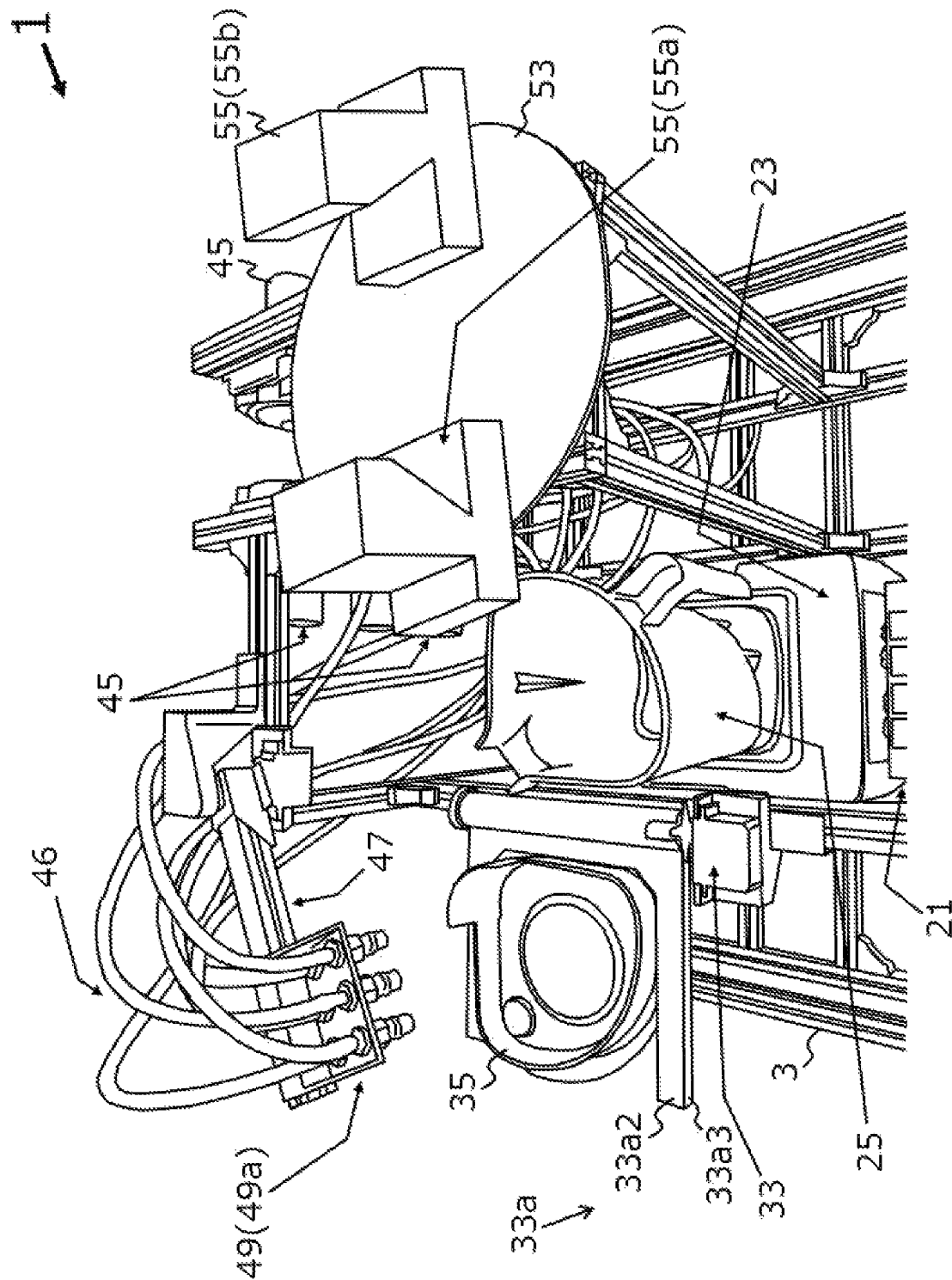
FIG. 5 is a perspective view illustrating a liquid input part approach step in the beverage producing apparatus according to the first embodiment.
Figure 6:
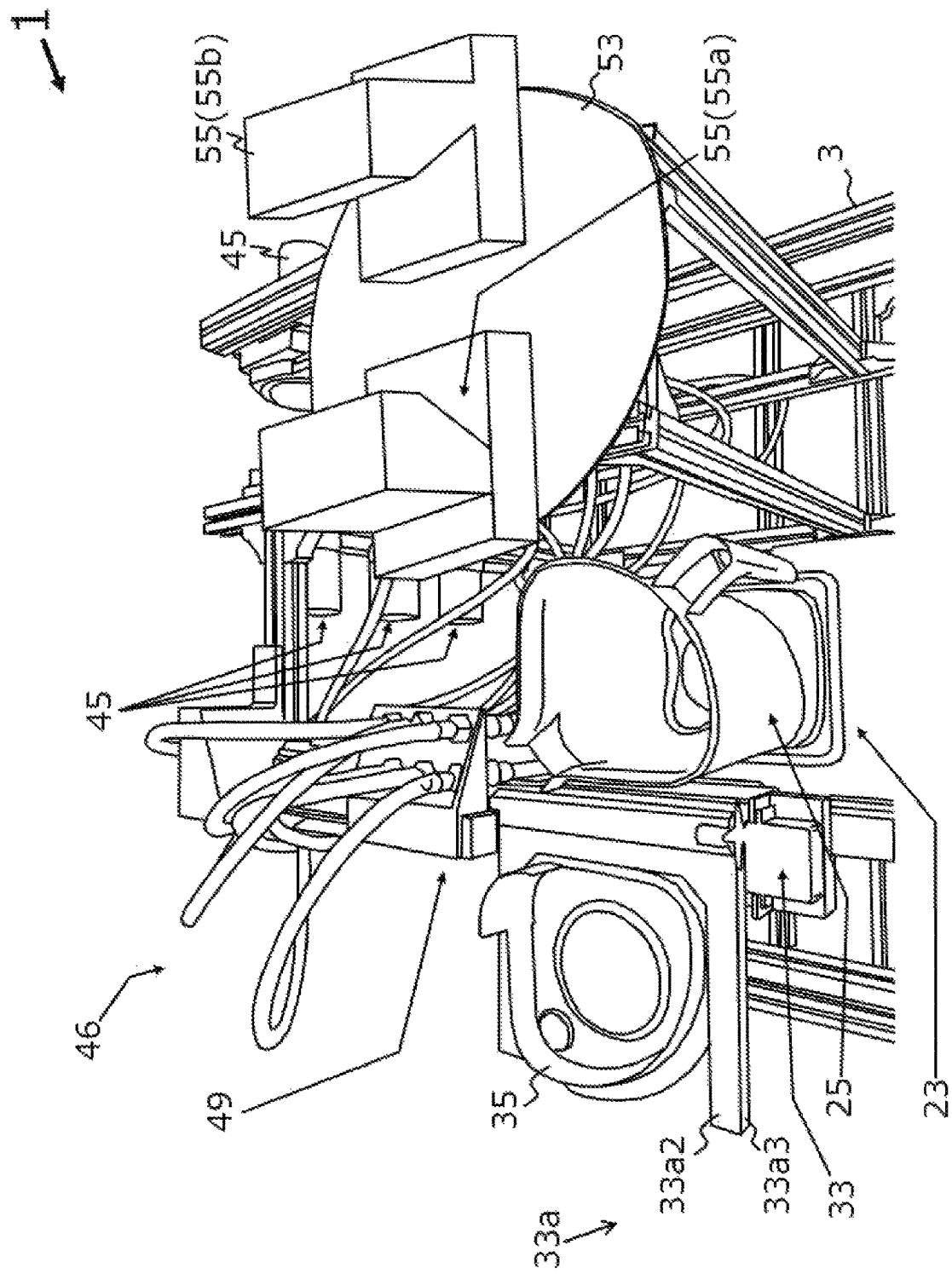
FIG. 6 is a perspective view illustrating a liquid input step in the beverage producing apparatus according to the first embodiment.

Specifically, when at least either of the liquid and the solid is input to the bottle 25, the lid transfer device 33 is operated such that the lid 35 is positioned off the above side of the bottle 25 (see FIG. 4 to FIG. 6).

Figure 7:
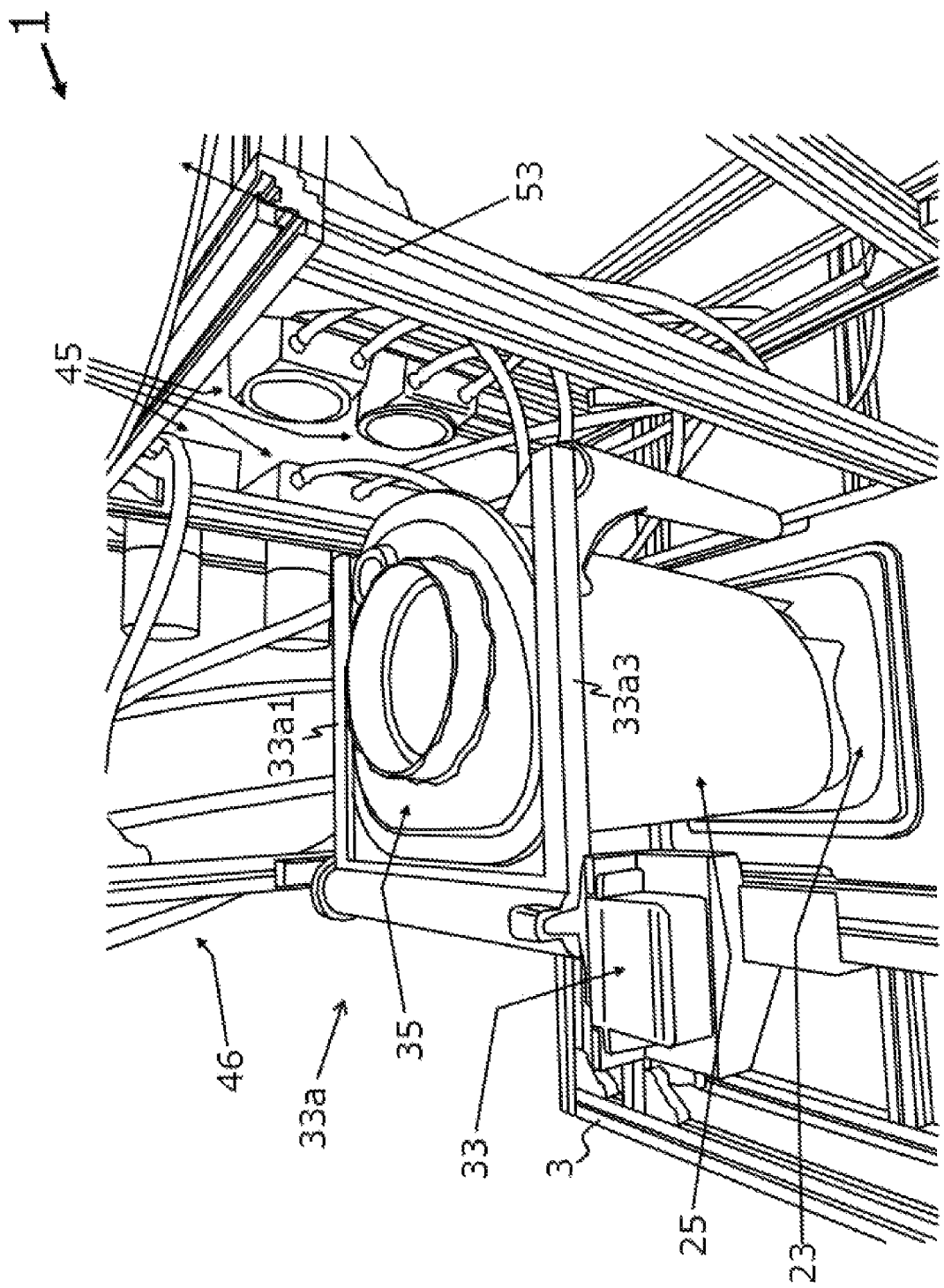
FIG. 7 is a perspective view illustrating a lid closing step in the beverage producing apparatus according to the first embodiment.

When the contents of the bottle 25 are cooked (pulverized or stirred), the lid transfer device 33 is operated such that the lid 35 is positioned on the above side of the bottle 25 and fixed to the bottle 25 (see FIG. 7).

(Lid Transfer Device 33)

The lid transfer device (lid opening/closing part) 33 holds the lid 35 in a state in which the lid 35 can be transferred at least between the above side of the bottle 25 and a position off the above side of the bottle 25.

However, the lid transfer device 33 releases the state of holding the lid 35 and draws away from the lid 35 after the cooking.

Not only after the cooking but also during the cooking, the lid transfer device 33 may release the state of holding the lid 35 to draw away from the lid 35.

The lid transfer device 33 includes a lid holding part 33a having a substantially U-shaped (groove-shaped) cross section.

The groove shape of the lid holding part 33a is constituted by an upper surface 33a1, a lower surface 33a2, and a vertical surface (connection surface) 33a3.

The upper surface 33a1 is positioned above the lower surface 33a2 in a state in which the lid 35 is positioned on the above side of the bottle 25.

The upper surface 33a1 holds the lid 35 so as not to fall off when the upper surface 33a1 is positioned under the lower surface 33a2.

The lower surface 33a2 holds the lid 35 so as not to fall off when the lower surface 33a2 is positioned under the upper surface 33a1.

Between the upper surface 33a1 and the lower surface 33a2, the vertical surface 33a3 is connected to the upper surface 33a1 and the lower surface 33a2.

The width, in a direction extending from the vertical surface 33a3, of the upper surface 33a1 is smaller than the width, in the direction extending from the vertical surface 33a3, of the lower surface 33a2.

In this case, the lid 35 is positioned on the above side of the bottle 25 and is easily attached to the lid holding part 33a in a state of not being turned upside down.

(Lid 35)

The lid 35 detachably closes the upper opening of the bottle 25.

In the first embodiment, the bottle 25 is placed on the stand 23 in a state in which the lid 35 is not attached to the bottle 25. In this case, the lid 35 is attached to the lid holding part 33a of the lid transfer device 33. However, the bottle 25 may be placed on the stand 23 in a state in which the lid 35 is attached to the bottle 25.

(Liquid Supply Controller 41)

The liquid supply controller 41 controls operations of the liquid feeding pump 45 and the liquid input part transfer device 47 on the basis of control signals from the controller 13.

Specifically, the liquid supply controller 41 causes the liquid feeding pump 45 to operate as described below depending on the operation state of the operation part 11. The liquid supply controller 41 causes, of the liquid feeding pumps 45, a liquid feeding pump corresponding to the operation state of the operation part 11 to operate. The liquid supply controller 41 causes the liquid contained in, of the liquid containers 43, a liquid container corresponding to the operation state of the operation part 11 to be supplied to the bottle 25 via the liquid input part 49.

In addition, when the liquid is supplied to the bottle via the liquid input part 49, the liquid supply controller 41 causes the liquid input part transfer device 47 to operate such that the liquid discharge port, from which the liquid from the liquid container 43 is discharged, of the liquid input part 49 is positioned on the above side of the bottle 25.

In addition, when the liquid is not supplied to the bottle 25 via the liquid input part 49, the liquid supply controller 41 causes the liquid input part transfer device 47 to operate such that the liquid input part 49 is positioned off the above side of the bottle 25.

(Liquid Container 43)

The liquid container 43 is a container for storing, of the materials, the liquid to be input to the bottle 25.

Multiple types of the liquid containers 43 are provided depending on the materials required for the beverage produced in the bottle 25.

(Liquid Feeding Pump 45)

The liquid feeding pump 45 is a pump that sucks up the liquid in the liquid container 43 and inputs the liquid to the bottle 25 via the liquid input part 49.

A plurality of the liquid feeding pumps 45 are provided depending on the number of containers of the liquid containers 43.

(Liquid Feeding Tube 46)

The liquid feeding tube 46 is made of a flexible tube.

The liquid feeding pump 45 and the liquid container 43, and the liquid feeding pump 45 and the liquid input part 49 communicate with each other via the liquid feeding tubes 46.

(Liquid Input Part Transfer Device 47)

The liquid input part transfer device (arm part) 47 holds the liquid input part 49 in a state in which the liquid input part 49 can be transferred at least between the above side of the bottle 25 and a position off the above side of the bottle 25.

(Liquid Input Part 49)

The liquid input part 49 is a pipe-shaped machine component, such as a nozzle 49a, that inputs the liquid in the liquid container 43 to the bottle 25.

In the first embodiment, an example is described in which six liquid input parts 49 are provided.

(Application Example of Liquid Feeding Pump 45)

In the first embodiment, an example has been described in which the liquid container 43, the liquid feeding pump 45, and the liquid input part 49 are positioned at distant places and they communicate with each other via the liquid feeding tubes 46, and in which the liquid feeding pump 45 is electrically driven.

However, the configurations of the liquid container 43, the liquid feeding pump 45, and the liquid input part 49 are not limited thereto.

For example, a configuration, including the liquid feeding pump 45 that is attached to the liquid container 43 and discharges the liquid in the liquid container 43 by being pressed down at the upper end portion, can be considered.

In this case, a hose, attached to the liquid feeding pump 45 and extending to the bottom of the liquid container 43, functions as the liquid feeding tube 46, and the tip portion (a portion where the nozzle 49a exists) of the liquid feeding pump 45 functions as the liquid input part 49. In addition, the liquid input part transfer device 47 holds the liquid container 43, the liquid feeding pump 45, and the liquid input part 49 in a state in which they can be transferred, and presses down the upper end portion of the liquid feeding pump 45 in a state in which the liquid discharge port of the liquid input part 49 is positioned on the above side of the bottle 25. The upper end portion of the liquid feeding pump 45 is pressed down by an electric button or the like that is controlled by the liquid supply controller 41.

(Application Example of Liquid Container 43)

In the first embodiment, an example has been described in which the liquid container 43 is provided at a position lower than the bottle 25.

However, the liquid container 43 may be provided at a position higher than the bottle 25.

In this case, the liquid may be dropped from the liquid container 43 into the bottle 25 via the liquid feeding tube 46 or the like by gravity with the liquid feeding pump 45 omitted. However, a valve that controls dropping of the liquid into the bottle 25 is provided in a discharge port or the like of the liquid container 43, and an operation thereof is controlled by the liquid supply controller 41.

(Solid Supply Controller 51)

The solid supply controller 51 controls operations of the solid input part transfer device 53 and the solid input part 55 on the basis of control signals from the controller 13.

Specifically, the solid supply controller 51 rotates the solid input part transfer device 53 and causes the solid to be supplied from the solid input part 55 as described below depending on the operation state of the operation part 11. The solid supply controller 51 rotates the solid input part transfer device 53 such that the solid discharge port, from which the solid (powder or granule) in, of the solid input parts 55, a solid input part corresponding to the operation state of the operation part 11 is discharged, is positioned on the above side of the bottle 25. The solid supply controller 51 causes the powder or the granule contained in, of the solid input parts 55, a solid input part corresponding to the operation state of the operation part 11 to be supplied to the bottle 25.

In a case where the power or the granules in a plurality of the solid input parts 55 are input to produce one beverage, the powder or the granules are sequentially supplied from said plurality of the solid input parts 55 to the bottle 25.

In a case where the powder or the granules in, for example, two solid input parts 55 are input to produce one beverage, the solid input part transfer device 53 is rotated such that the solid discharge port of a first solid input part 55a is positioned on the above side of the bottle 25, whereby the powder or the granule contained in the first solid input part 55a is supplied from the solid discharge port of the first solid input part 55a to the bottle 25. Thereafter, the solid input part transfer device 53 is rotated such that the solid discharge port of a second solid input part 55b is positioned on the above side of the bottle 25, whereby the powder or the granule contained in the second solid input part 55b is supplied from the solid discharge port of the second solid input part 55b to the bottle 25.

Note that, in the first embodiment, an example is described in which two solid input parts 55 (first solid input part 55a, second solid input part 55b) are provided, but the number of the solid input parts 55 is not limited to two.

(Solid Input Part Transfer Device 53)

The solid input part transfer device (turntable) 53 holds each of the solid input parts 55 in a state in which the solid discharge port of said solid input part 55 can be transferred at least between the above side of the bottle 25 and a position off the above side of the bottle 25.

(Solid Input Part 55)

The solid input part 55 is a supply device that stores, of the materials, the powder or the granule to be input to the bottle 25 and discharges said powder or the granule downward from the solid discharge port.

The solid input part 55 may be configured to push out the powder or the granule by a linear movement to discharge the powder or the granule from the solid discharge port, or may be configured to discharge the powder or the granule from the solid discharge port by rotation.

The solid to be input via the solid input part 55 may contain ice.

However, a form may be adopted in which an ice machine is separately provided around the stand 23 to supply ice from said ice machine to the bottle 25.

In this case, the amount of the ice to be input from said ice machine to the bottle 25 is adjusted depending on the operation state of the operation part 11.

(Specific Example of Solid Input Part 55)

Figure 8:
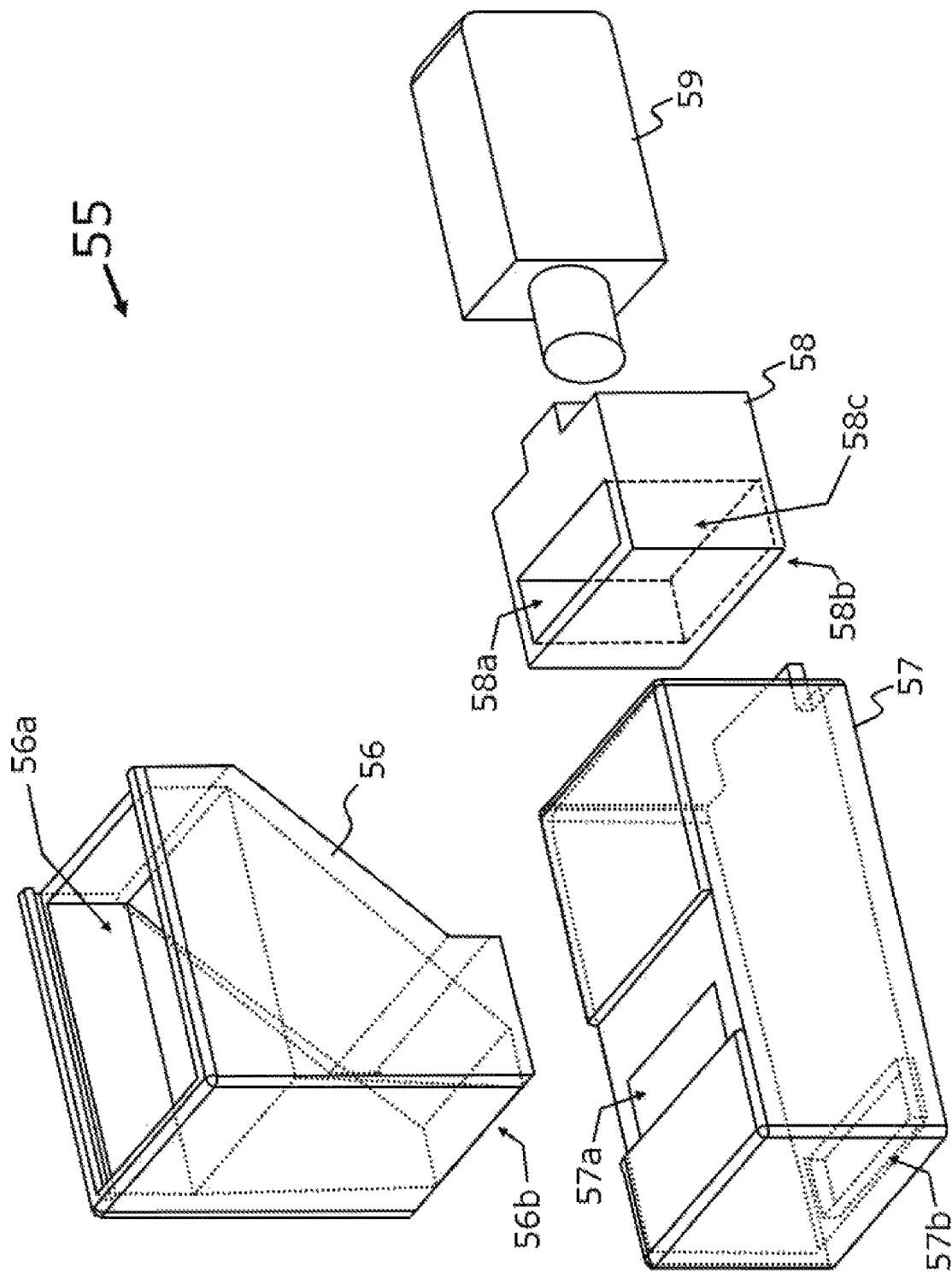
FIG. 8 is an exploded perspective view of a solid input part according to the first embodiment.
Figure 9:
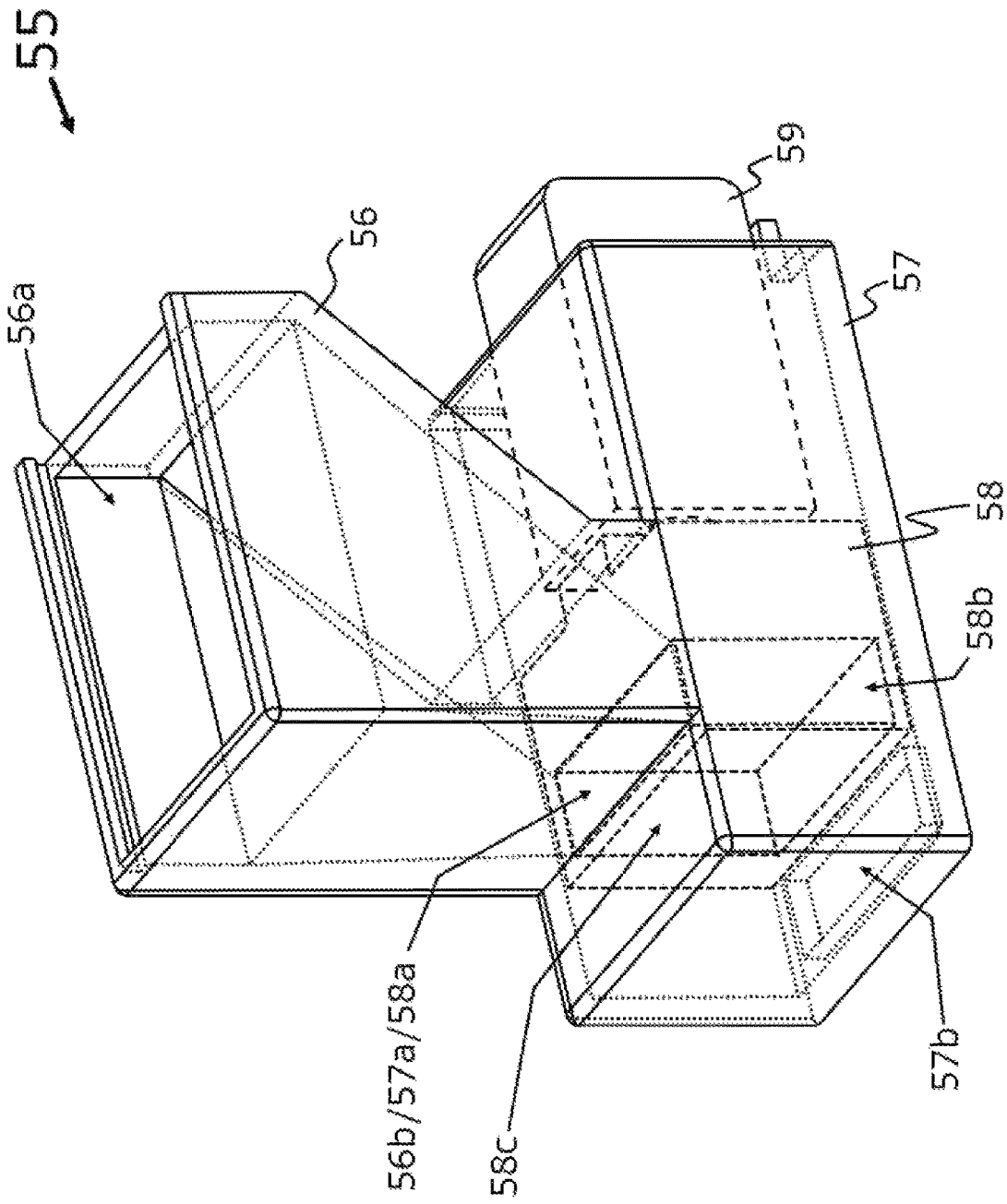
FIG. 9 is a perspective view of the solid input part when a fixed amount holding part according to the first embodiment is at a first position.
Figure 10:
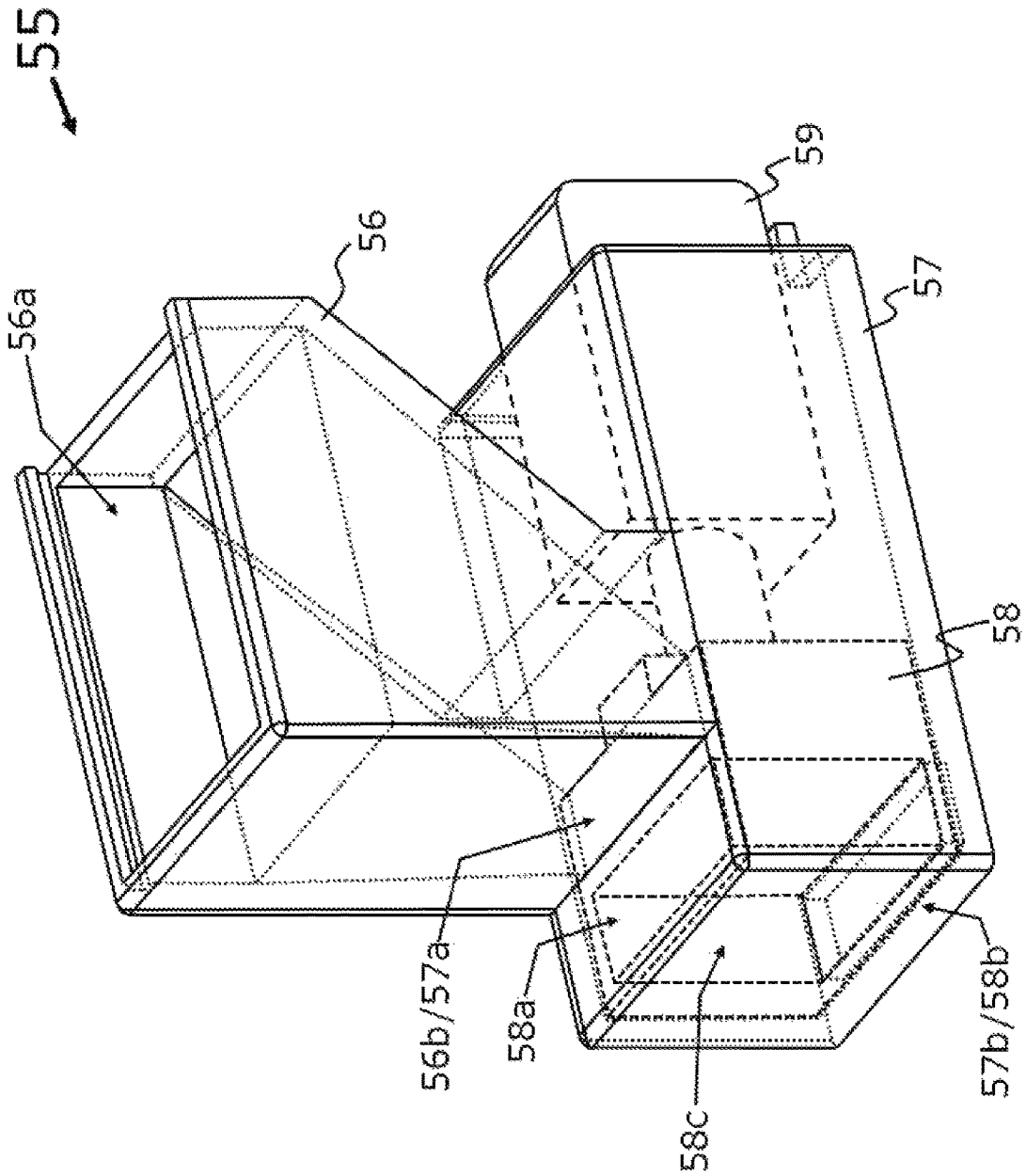
FIG. 10 is a perspective view of the solid input part when the fixed amount holding part according to the first embodiment is at a second position.

As illustrated in FIG. 8 to FIG. 10, the solid input part 55 includes, for example, a shooter 56, a passage part 57, a fixed amount holding part 58, and a holding part transfer device 59.

In FIG. 8 to FIG. 10, a part of a portion invisible from the outside, such as a second discharge port 57b, is indicated by dotted lines or broken lines for easy description of internal structure.

However, the configuration of the solid input part 55 is not limited to that illustrated in FIG. 8 to FIG. 10.

(Shooter 56)

The shooter 56 is a container that holds the powder or the granule, and has a first input port 56a on the upper side and a first discharge port 56b, communicating with the first input port 56a, on the lower side. The shooter 56 has a substantially trapezoidal column shape penetrating in the vertical direction, and has a slope shape such that the first input port 56*a* is larger than the first discharge port 56*b*.

(Passage Part 57)

The passage part 57 has a substantially rectangular parallelepiped shape penetrating in the horizontal direction.

The shooter 56 is attached to the upper side of the passage part 57.

A second input port 57*a* is provided at a position that is on the upper surface of the passage part 57 and faces the first discharge port 56*b* of the shooter 56, and the second discharge port 57*b* is provided in the lower surface of the passage part 57.

The second discharge port 57*b* does not overlap the second input port 57*a* in the vertical direction, and is provided at a position closer to the tip portion than the second input port 57*a*.

The second discharge port 57*b* is positioned on the above side of the bottle 25 in a solid input part approach step to be described later.

The shooter 56 and the passage part 57 may be configured separately or integrally.

(Fixed Amount Holding Part 58)

The fixed amount holding part 58 is slidably held in the passage part 57.

That is, the fixed amount holding part 58 can be transferred between a first position and a second position.

The fixed amount holding part 58 has a substantially rectangular parallelepiped shape penetrating in the vertical direction.

A third input port 58*a* is provided in the upper surface of the fixed amount holding part 58, and a third discharge port 58*b*, communicating with the third input port 58*a*, is provided in the lower surface of the fixed amount holding part 58.

The shape and size of a hole 58*c* of the fixed amount holding part 58 are determined such that the volume of the hole 58*c*, having a substantially rectangular parallelepiped shape and extending between the third input port 58*a* and the third discharge port 58*b* of the fixed amount holding part 58, becomes substantially the same as the volume of the powder or the granule necessary for inputting to the bottle 25 in one powder input (powder input step to be described later).

(Effects of Discharging Solid by Shooter 56 and Fixed Amount Holding Part 58)

Since the hole 58*c* of the fixed amount holding part 58 is filled with a fixed amount of the powder or the granules, the powder or the granules are input when the fixed amount holding part 58 is at the first position, and the input powder or granules are discharged when the fixed amount holding part is at the second position. Therefore, it is possible to input a predetermined amount of the powder or the granules to the bottle 25 depending on the size of the hole 58*c*.

In addition, multiple types of the fixed amount holding parts 58, having different sizes of the holes 58*c*, are provided depending on the types and input amounts of the powder or the granules to be input to the bottle 25.

As a result, it is possible to input various input amounts of the powder or the granules to the bottle 25 by preparing a plurality of the solid input parts in which the shooters 56, the passage parts 57, and the holding part transfer devices 59 are the same as each other and only the fixed amount holding parts 58 hold the holes 58*c* different from each other.

(Holding Part Transfer Device 59)

The holding part transfer device 59 is held in the passage part 57.

The holding part transfer device 59 transfers the fixed amount holding part 58 between the first position and the second position.

That is, the holding part transfer device 59 has an actuator or the like that pushes and pulls the fixed amount holding part 58 in a direction in which the passage part 57 extends.

The operation of pushing the fixed amount holding part 58 and the operation of pulling the fixed amount holding part 58, by the holding part transfer device 59, are based on electrical operations of said actuator. However, at least either of the operation of pushing the fixed amount holding part 58 and the operation of pulling the fixed amount holding part 58, by the holding part transfer device 59, may be based on a biasing force by an elastic member such as a spring.

(Operation of Fixed Amount Holding Part 58)

When the fixed amount holding part 58 is at the first position, the third input port 58*a* faces the first discharge port 56*b* and the second input port 57*a*, and the third discharge port 58*b* faces the inner wall of the lower surface of the passage part 57 (see FIG. 9).

At least a part of the powder or the granules stored in the shooter 56 is dropped into the hole 58*c* of the fixed amount holding part 58 via the first discharge port 56*b*, the second input port 57*a*, and the third input port 58*a*.

That is, when the fixed amount holding part 58 is at the first position, the fixed amount holding part 58 receives the supply of the powder or the granule from the shooter 56.

The third discharge port 58*b* is blocked by the inner wall of the lower surface of the passage part 57. Therefore, the powder or the granule dropped into the hole 58*c* is not discharged downward from the hole 58*c*.

When the fixed amount holding part 58 is at the second position, the third input port 58*a* faces the inner wall of the upper surface of the passage part 57, and the third discharge port 58*b* faces the second discharge port 57*b* (see FIG. 10).

The third input port 58*a* is blocked by the inner wall of the upper surface of the passage part 57. Therefore, the powder or the granule stored in the shooter 56 is not dropped into the hole 58*c*.

The powder or the granules dropped into the hole 58*c* are dropped into the bottle 25 positioned thereunder via the third discharge port 58*b* and the second discharge port 57*b*.

That is, when the fixed amount holding part 58 is at the second position, the fixed amount holding part 58 discharges the powder or the granules for inputting the powder or the granules stored in the fixed amount holding part 58 to the bottle 25.

Note that, of the materials, all of the liquid may be input to the bottle 25 via the liquid input part 49, and of the materials, all of the powder or the granules may be input to the bottle 25 via the solid input part 55. However, at least a part of the materials (milk, ice, etc.) may be manually input to the bottle 25 by a user before the bottle 25 is placed on the stand 23.

(Beverage Producing Procedure)

Next, a procedure for producing a beverage (beverage producing method) will be described.

In advance, the liquid container 43 is filled with a predetermined liquid and the solid input part 55 is filled with predetermined powder or granules.

The fixed amount holding part 58 of the solid input part 55 is disposed at the first position, and the hole 58*c* is filled with the powder or the granules dropped from the shooter 56.

First, the bottle 25 is placed on the stand 23 in a state in which the lid 35 is yet to be attached to the bottle 25.

The lid 35 is attached to the lid holding part 33a of the lid transfer device 33.

No material is input to the bottle 25. However, the bottle 25, in a state in which a part of the material is manually input by a user, may be placed on the stand 23.

Next, the user operates one of the first button 11a to the fourth button 11d of the operation part 11 (button operating step).

When the first button 11a is operated, an operation for producing a large volume of a beverage (first beverage) corresponding to the first button 11a is started.

When the second button 11b is operated, an operation for producing a small volume of a beverage (first beverage) corresponding to the second button 11b is started.

When the third button 11c is operated, an operation for producing a large volume of a beverage (second beverage) corresponding to the third button 11c is started.

When the fourth button 11d is operated, an operation for producing a small volume of a beverage (second beverage) corresponding to the fourth button 11d is started.

After the button operating step and before a liquid input step to be described later, the opening/closing controller 31 causes the lid transfer device 33 to hold the lid 35 and transfer the lid 35 to a position off the above side of the bottle 25 (see FIG. 4, lid retreat step).

After the transfer of the lid 35 is completed, the liquid supply controller 41 transfers the liquid input part transfer device 47 such that the liquid discharge port of the liquid input part 49 is positioned on the above side of the bottle 25 (see FIG. 5, liquid input part approach step).

The solid supply controller 51 rotates the solid input part transfer device 53 such that a solid discharge port (e.g., the second discharge port 57b of the passage part 57 of the first solid input part 55a) of, of the solid input parts 55, a solid input part (e.g., the first solid input part 55a) corresponding to the operation state of the operation part 11 is positioned on the above side of the bottle 25 (solid input part approach step).

The liquid supply controller 41 operates, of the liquid feeding pumps 45, a liquid feeding pump corresponding to the operation state of the operation part 11. As a result, the liquid is extracted from, of the liquid containers 43, a liquid container corresponding to the operation state of the operation part 11, which is supplied to the bottle 25 via the liquid input part 49 (see FIG. 6, liquid input step).

When there is no need to supply the liquid to the bottle 25, the liquid input part approach step and the liquid input step are omitted.

The solid supply controller 51 operates, of the solid input part 55, a solid input part whose solid discharge port is positioned on the above side of the bottle 25, so that the powder or the granules are supplied to the bottle from the solid discharge port of said solid input part (powder or granule input step).

For example, the fixed amount holding part 58 of the first solid input part 55a is transferred from the first position to the second position by the holding part transfer device 59. As a result, the powder or the granules filling the hole 58c of the fixed amount holding part 58 of the first solid input part 55a are discharged via the third discharge port 58b and the second discharge port 57b and input to the bottle 25.

After a lapse of a first time t1 (e.g., t1=1 second) since the transfer to the second position, the fixed amount holding part 58 is transferred from the second position to the first position by the holding part transfer device 59. As a result, the hole 58c is refilled with the powder or the granules from the shooter 56. The first time t1 has at least a time required for all of the powder or the granules filling the hole 58c to be discharged via the third discharge port 58b.

In a case where there are a plurality of the powder or granules to be supplied to the bottle 25, the solid input part approach step and the powder or granule input step are performed multiple times.

When there is no need to supply the granule nor the powder to the bottle 25, the solid input part approach step and the powder or granule input step are omitted.

After the powder or granule input step and before a lid closing step to be described later, the liquid supply controller 41 transfers the liquid input part transfer device 47 such that the liquid discharge port of the liquid input part 49 is positioned off the above side of the bottle 25 (liquid input part retreat step).

Note that, the solid input part transfer device 53 may be rotated such that the solid discharge port of the solid input part 55 is positioned off the above side of the bottle 25.

After the transfer of the liquid input part transfer device 47 is completed, the opening/closing controller 31 causes the lid transfer device 33 to transfer the lid 35 to the above side of the bottle 25 to close the lid 35 (see FIG. 7, lid closing step).

After the lid closing step, the lid holding part 33a may release the state of holding the lid 35, and the lid transfer device 33 may transfer the lid holding part 33a to a position off the above side of the bottle 25 (lid holding part retreat step). After the lid closing step and before a motor stop step to be described later, the lid holding part 33a may maintain the state of holding the lid 35 so that the lid 35 is not positioned off the bottle 25.

After the lid 35 is attached to the bottle 25, the mixer controller 21 operates any one of the first control button 21a to the fourth control button 21d corresponding to, of the first button 11a to the fourth button 11d, the button operated in the button operating step.

As a result, any one of the first operation button 23a to the fourth operation button 23d of the stand 23 is pressed down corresponding to, of the first button 11a to the fourth button 11d, the button operated in the button operating step, and the motor of the stand 23 rotates corresponding to the pressed down operation button (stand operating step).

With the rotation of the motor, the cutter of the bottle 25 rotates, so that the materials in the bottle 25 are pulverized or stirred.

After a lapse of a second time t2 (e.g., t2=30 seconds), a beverage corresponding to, of the first button 11a to the fourth button 11d, the button selected in the button operating step, is produced in the bottle 25, and the motor of the stand 23 is stopped (motor stop step).

The user detaches the bottle 25 from the stand 23, takes out the bottle 25 and the lid 35 to the outside of the housing 3, and transfers the beverage produced in the bottle 25 to a predetermined cup.

(Effect of Performing Operation Control of Liquid Input, Etc.)

When a user simply places the bottle 25 on the stand 23, operates the operation part 11, and the like, operation controls of input of the liquid and the like, which are materials of a beverage to be produced, to the bottle 25, and the like are performed, and it is possible to provide the beverage produced by mixing a plurality of the materials.

(Effect of Providing Transfer Devices)

With the transfer devices (the lid transfer device 33, the liquid input part transfer device 47, the solid input part transfer device 53), it is possible to replace the members (the lid 35, the liquid input part 49, the solid input part 55) that are positioned on the above side of the bottle 25 and to effectively use the space on the above side of the bottle 25.

(Cooperation with External Equipment)

Figure 11:
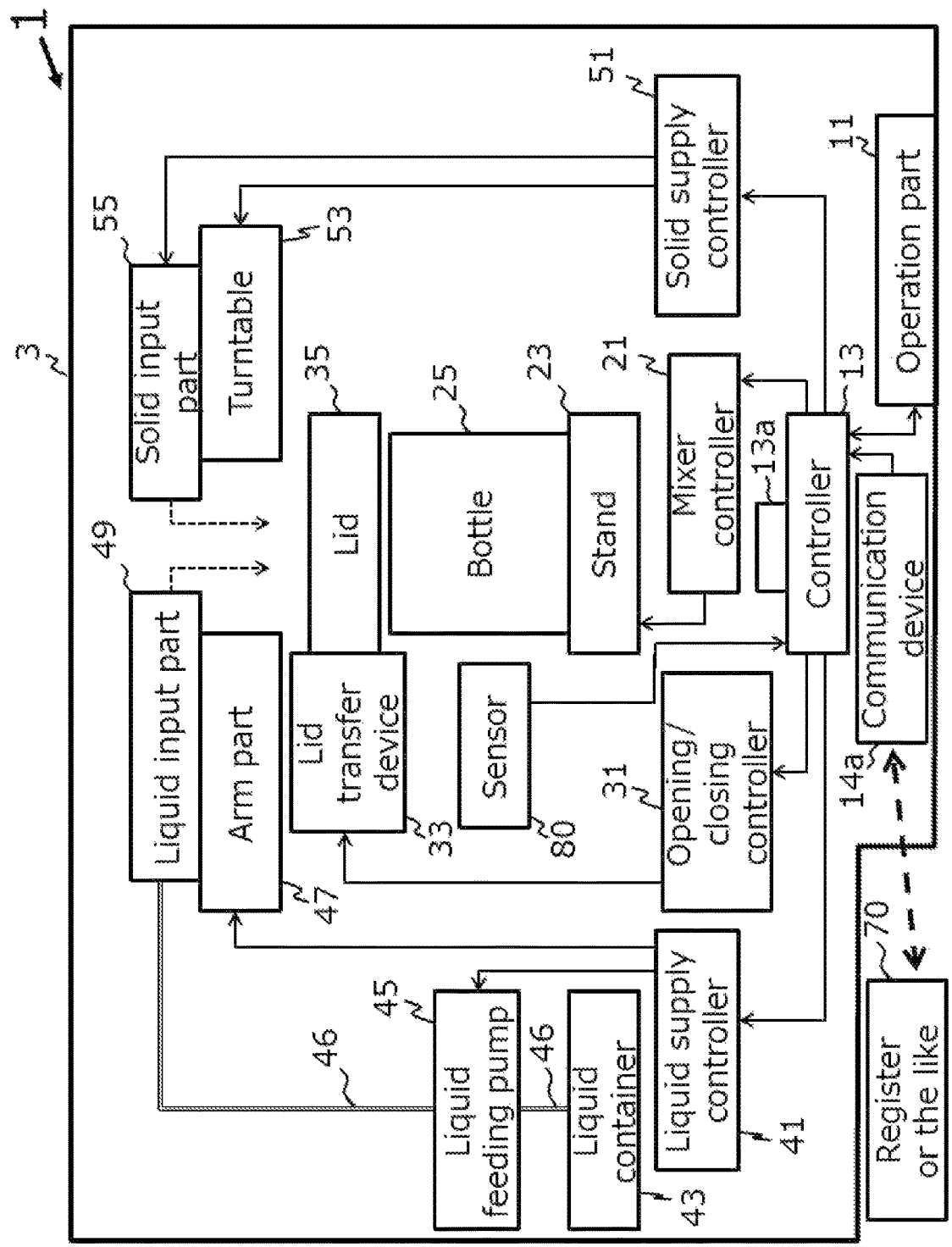
FIG. 11 is a configuration view illustrating respective members of a beverage producing apparatus according to a second embodiment.
Figure 12:
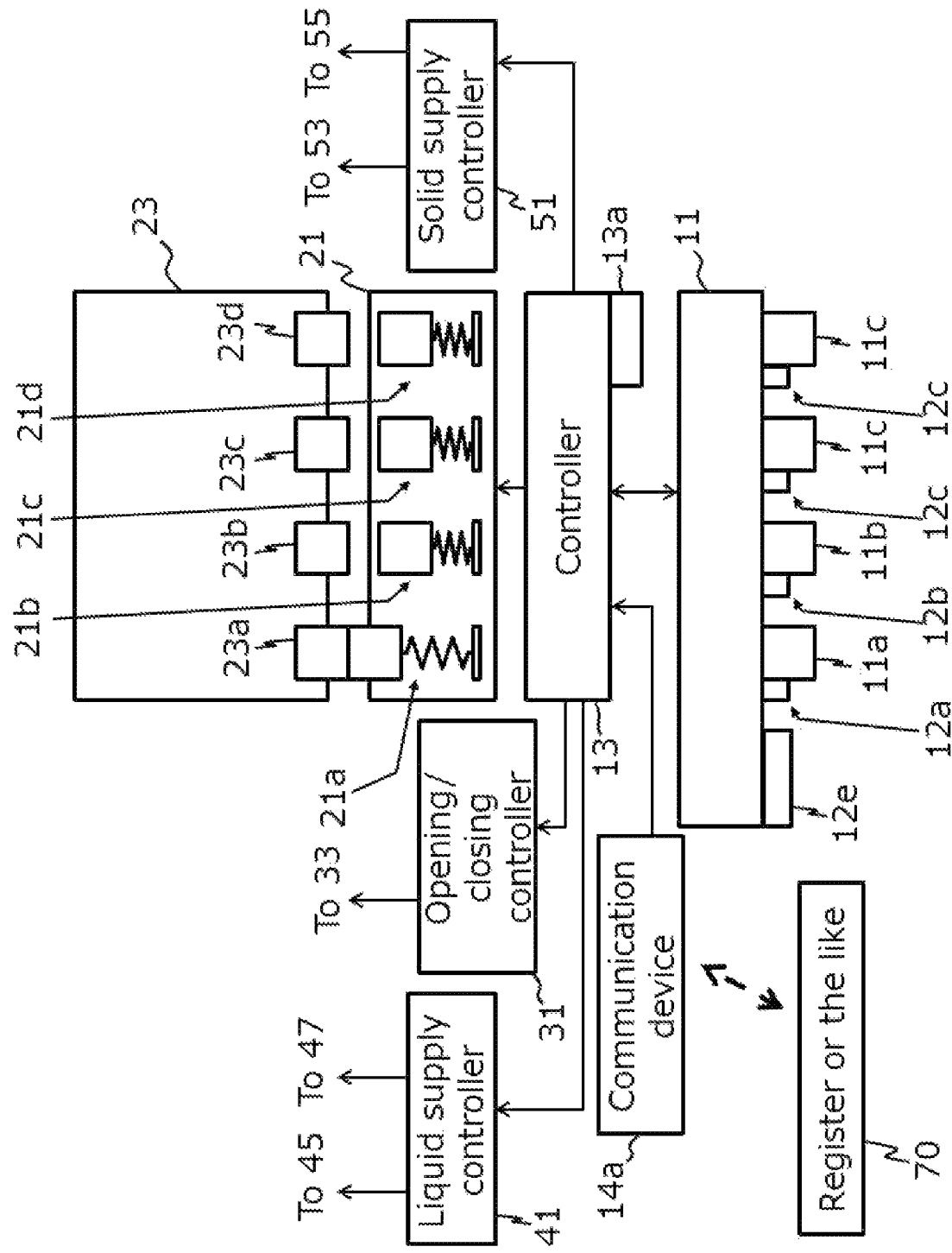
FIG. 12 is a view illustrating configurations of a stand, a mixer controller, and a controller according to the second embodiment.

Next, a second embodiment will be described (see FIG. 11 and FIG. 12).

In the second embodiment, the beverage producing apparatus 1 includes an external equipment cooperation part.

The external equipment coordination part has a communication device 14a.

The communication device 14a receives order information on a beverage to be produced by the beverage producing apparatus 1 from external equipment such as a register 70 (receiving step). On the basis of the order information received by the communication device 14a, the operation part 11 outputs information on a beverage to be produced next by the beverage producing apparatus 1.

Specifically, the operation part 11 has a first output part 12a near the first button 11a, has a second output part 12b near the second button lib, has a third output part 12c near the third button 11c, and has a fourth output part 12d near the fourth button lid.

On the basis of said order information transmitted from the external equipment, an output part of the first output part 12a to the fourth output part 12d, which corresponds to the button of the operation part 11 corresponding to the beverage to be produced next by the beverage producing apparatus 1, is turned on.

For example, in a case where the beverage to be produced next by the beverage producing apparatus 1 is a large volume of the first beverage, the first output part 12a corresponding to the first button 11a is turned on.

(Effect of Outputting Information on Beverage to be Produced Next)

It is easy for a user to operate the operation part 11 of the beverage producing apparatus 1 according to the order of the orders received via external equipment such as a register 70.

In the second embodiment, sensors 80 that acquire information on the materials input to the bottle 25 are provided around the stand 23. In addition, a fifth output part 12e is provided in the operation part 11 or the like.

The sensors 80 detect weight of the bottle 25, temperature, color, and the like.

On the basis of the information detected by the sensors 80, the controller 13 specifies the type and amount of a beverage that can be produced from the types and amounts of the materials input to the bottle 25, and determines whether the specified type and amount match the type and amount of the beverage selected via the operation part 11.

In a case where they do not match, the controller 13 causes the fifth output part 12e to output "information on the type and amount of the beverage produced from the materials input to the bottle 25" by voice or video.

(Effect of Specifying Input Materials and the Like)

Said determination is made after the first button 11a to the fourth button 11d of the operation part 11 are operated.

As a result, it is possible to notify a user or the like of whether the materials manually input to the bottle 25 by the user are correct corresponding to the type and amount of the beverage selected via the operation part 11.

Further, said determination is made after the liquid is input via the liquid input part 49 and after the powder or granules is/are input via the solid input part 55.

As a result, it is possible to notify a user or the like of whether the liquid input via the liquid input part 49 and the powder or granules input via the solid input part 55 are correct corresponding to the type and amount of the beverage selected via the operation part 11.

Note that the sensors 80 may be used for a purpose other than the purpose of specifying the materials input to the bottle 25.

For example, the sensors 80 detect: whether the bottle 25 is correctly placed on the stand 23; whether the lid 35 is correctly attached to the bottle 25 in the lid closing step; whether the liquid input part 49 has transferred to the above side of the bottle 25 in the liquid input part approach step; whether the liquid input part 49 has transferred to a predetermined place in the liquid input part retreat step; a remaining amount of the liquid in the liquid container 43; and a remaining amount of the powder or the granules in the solid input part 55.

(Application Example of Widths of Upper Surface 33a1 and Lower Surface 33a2)

Figure 13:
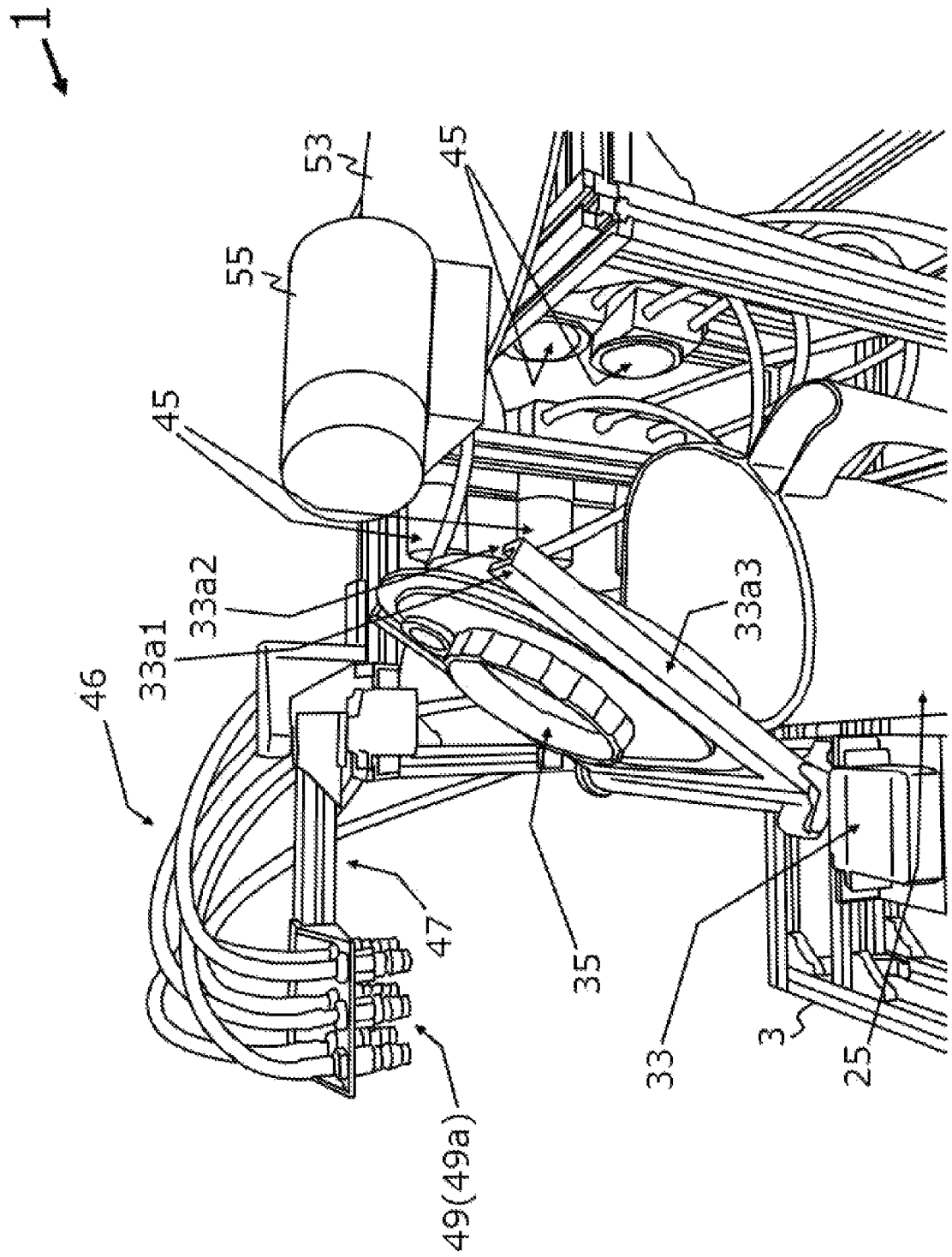
FIG. 13 is a perspective view illustrating a lid retreat step in a beverage producing apparatus according to a third embodiment.

Next, a third embodiment will be described (see FIG. 13).

In the first embodiment, an example has been described in which the width of the upper surface 33a1 of the lid holding part 33a is smaller than that of the lower surface 33a2, but the width of the upper surface 33a1 may be larger than that of the lower surface 33a2.

In this case, the lid 35 is easily attached to the lid holding part 33a in a state in which the lid 35 is away from the bottle 25 and is turned upside down.

(Application Example of Cleaning Water Supply)

Figure 14:
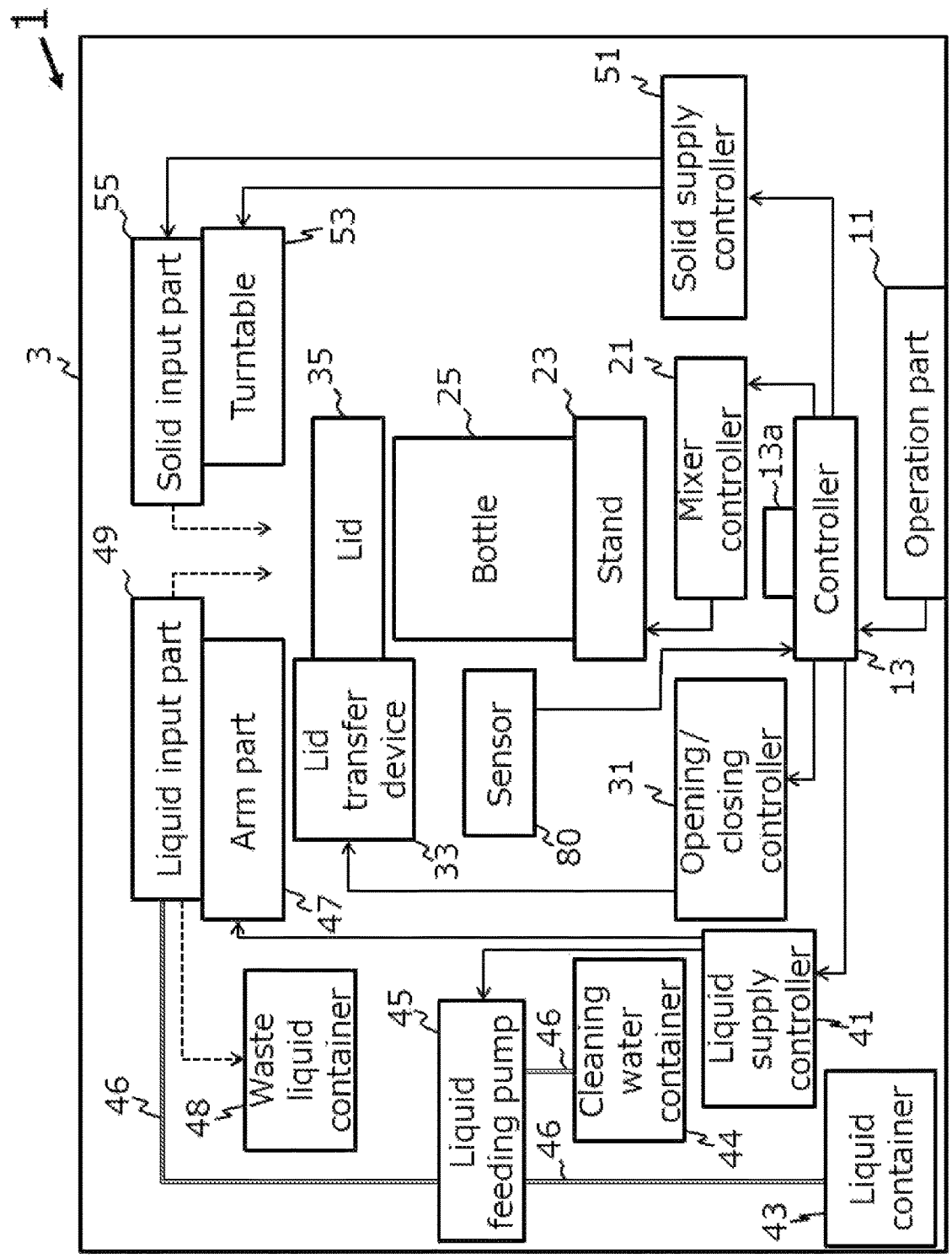
FIG. 14 is a configuration view illustrating respective members of a beverage producing apparatus according to a fourth embodiment.

Next, a fourth embodiment will be described (see FIG. 14).

In the first embodiment, an example has been described in which the liquid feeding pump 45 pumps up only the liquid in the liquid container 43 for beverages, but may further pump up a liquid (cleaning water) in a cleaning water container 44 for cleaning.

In this case, the liquid feeding pump 45 switches a liquid to be pumped up between the liquid container 43 and the cleaning water container 44.

When passing through the liquid input part 49 from the liquid feeding pump 45 via the liquid feeding tube 46, the cleaning water cleans the insides of the liquid feeding tube 46 and the liquid input part 49.

A waste liquid container 48 is provided to store the cleaning water after cleaning.

The case of supplying the liquid to the bottle 25 placed on the stand 23 is the same as in the first embodiment.

When the liquid input part 49 or the like is cleaned, that is, when the cleaning water is caused to flow through the liquid input part 49, the liquid input part transfer device 47 positions the liquid discharge port of the liquid input part 49 at a position that is off the above side of the bottle 25 and on the above side of the waste liquid container 48. The liquid feeding pump 45 pumps up the cleaning water from the cleaning water container 44, which passes through the insides of the liquid feeding tube 46 and the liquid input part 49, and is discharged to the waste liquid container 48.

The liquid input part 49 and the like are cleaned during, for example, a lid closing step, a stand operating step, or a motor stop step that will be described later.

One of the sensors 80 is provided near the waste liquid container 48 to detect the amount of the liquid stored in the waste liquid container 48.

On the basis of information on the amount of the liquid stored in the waste liquid container 48, the controller 13 causes the fifth output part 12e of the operation part 11 to output "information prompting disposal or the like of the liquid in the waste liquid container 48" by voice or video.

(Application Example of Transferring Bottle 25)

Figure 15:
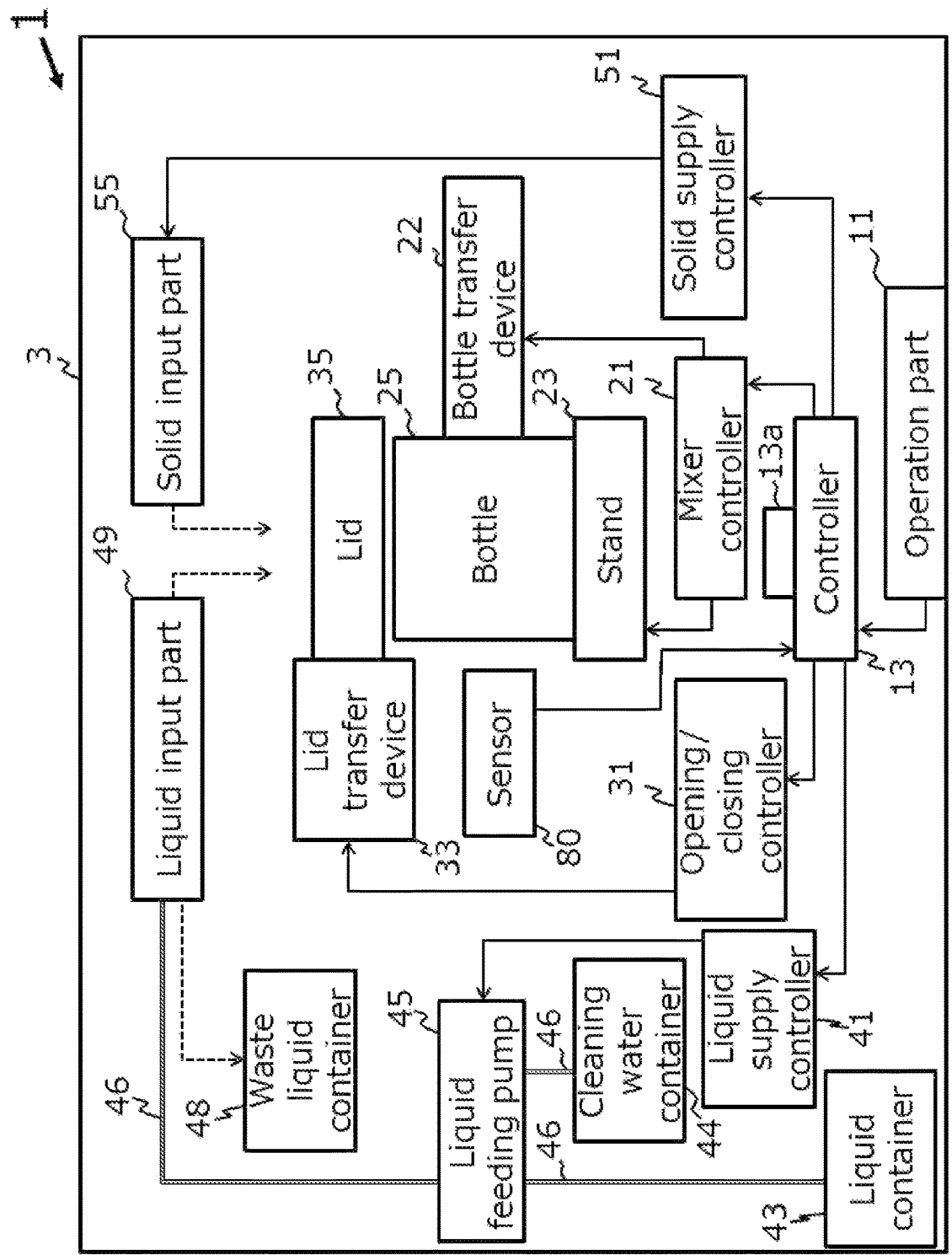
FIG. 15 is a configuration view illustrating respective members of a beverage producing apparatus according to a fifth embodiment.
Figure 16:
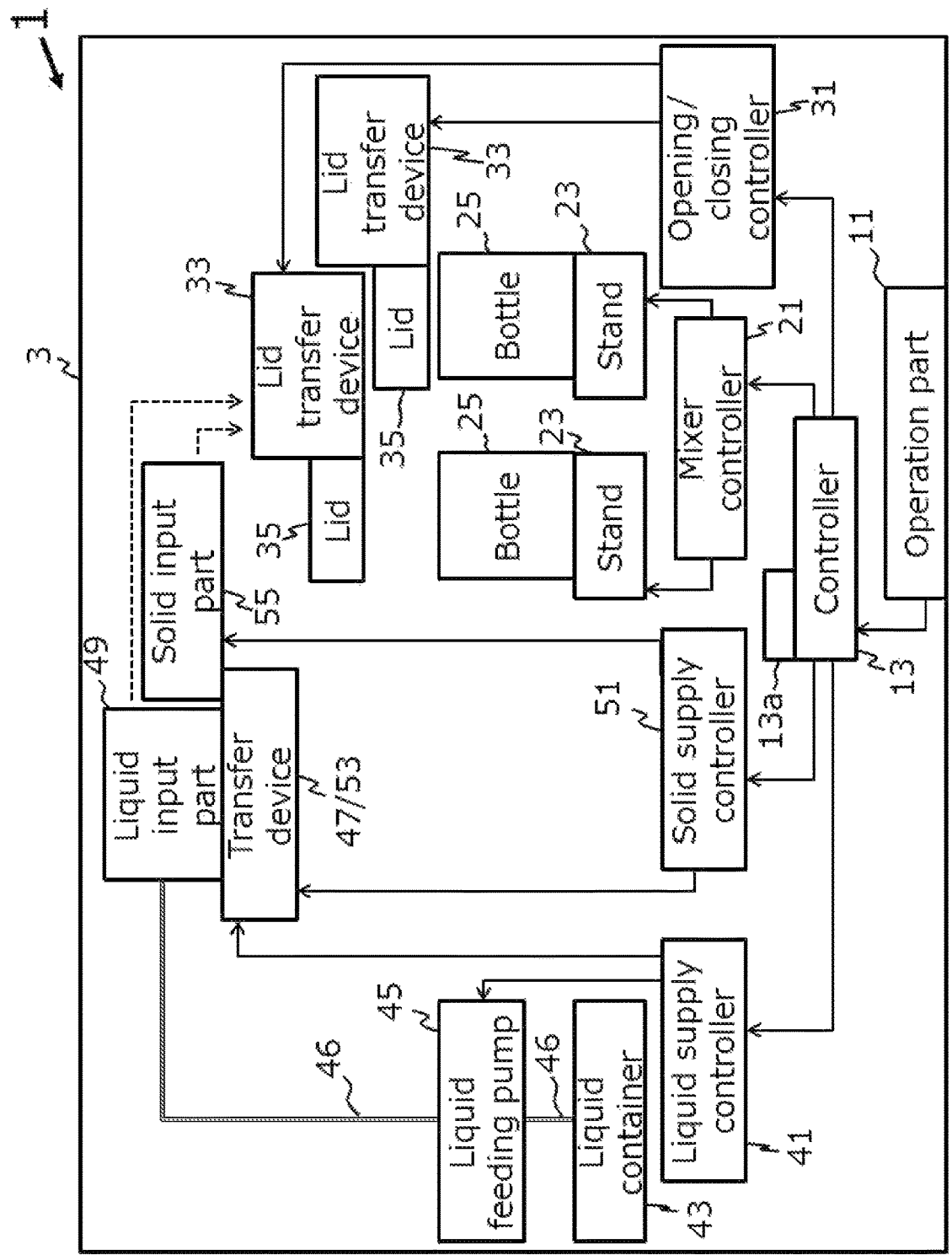
FIG. 16 is a configuration view illustrating respective members of a beverage producing apparatus according to sixth and seventh embodiments.
Figure 17:
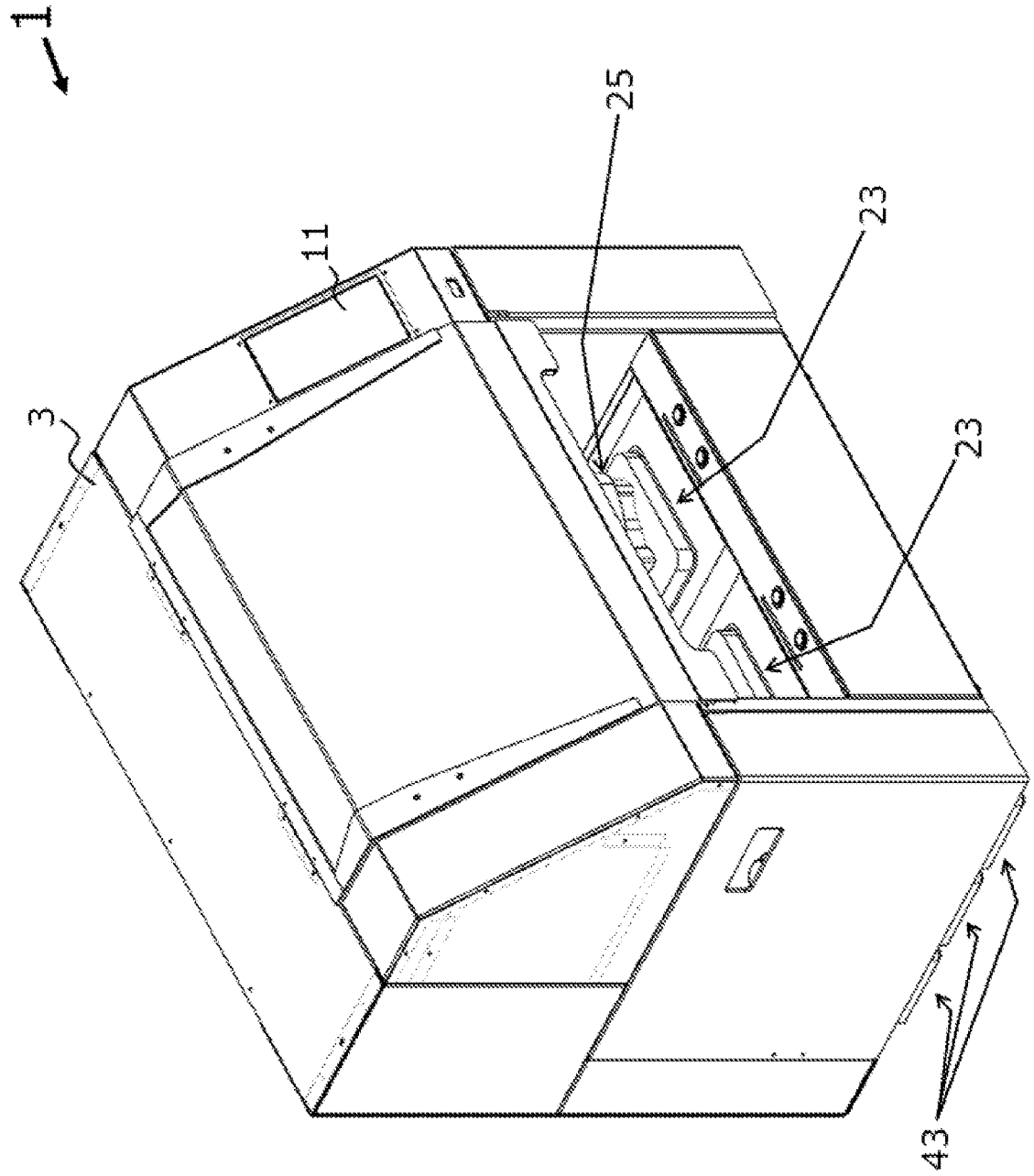
FIG. 17 is a perspective view illustrating an appearance of the beverage producing apparatus according to the sixth and seventh embodiments.

Next, a fifth embodiment will be described (see FIG. 15).

In the first embodiment, an example has been described in which the liquid input part 49 is transferred using the liquid input part transfer device 47 and the solid input part 55 is transferred using the solid input part transfer device 53, but the bottle 25 may be transferred.

In this case, a bottle transfer device 22 is provided.

The bottle transfer device 22 of the fifth embodiment holds the bottle 25, and transfers the bottle 25 to a position on the under side of the liquid discharge port of the liquid input part 49 or transfers the bottle 25 to a position on the under side of the solid discharge port of the solid input part 55. Also, after the liquid input step and the powder or granule input step and before the lid closing step, the bottle transfer device 22 transfers the bottle 25 to a position on the above side of the stand 23 (bottle transfer step).

In the fifth embodiment, the liquid input part transfer device 47 and the solid input part transfer device 53 are omitted.

Since the bottle 25 is transferred instead of the transfer of the liquid input part 49 and the solid input part 55, paths for inputting the materials to the bottle 25 can be shortened.

When the liquid feeding pump 45 is attached to the liquid container 43 such that the liquid in the liquid container 43 is discharged by pressing down the upper end portion, when the hose extending from the liquid feeding pump 45 to the bottom of the liquid container 43 functions as the liquid feeding tube 46, and when the tip portion of the liquid feeding pump 45 functions as the liquid input part 49, a set of the liquid container 43, the liquid feeding pump 45, the liquid feeding tube 46, and the liquid input part 49, which are currently existing, can be utilized. As a result, the possibility that the materials may come into contact with other machines can be reduced.

In this case, a device included in the beverage producing apparatus 1, such as the bottle transfer device 22 or a pressing-down device (not illustrated), presses down the upper end portion of the liquid feeding pump 45 in a state in which the bottle 25 is positioned under the liquid discharge port of the liquid input part 49.

(Application Example of Transferring Liquid Input Part 49 and Solid Input Part 55 at One Time)

Next, a sixth embodiment will be described (see FIG. 16 to FIG. 19).

In the first embodiment, an example has been described in which the liquid input part transfer device 47 and the solid input part transfer device 53 are configured separately, and the liquid input part 49 and the solid input part 55 are transferred separately.

However, the liquid input part transfer device 47 and the solid input part transfer device 53 may be integrally configured, and the liquid input part 49 and the solid input part 55 may be transferred together.

In the sixth embodiment, a transfer device (the liquid input part transfer device 47 and the solid input part transfer device 53) is configured such that the liquid input part 49 and the solid input part 55 are transferred in one horizontal direction (a direction in which two stands 23 line up).

The liquid input part 49 and the solid input part 55 can be transferred in one movement.

In addition, the liquid input part 49 and the like are disposed such that the tip portions of a plurality of the nozzles 49a of the liquid input part 49 and the respective discharge ports of a plurality of the solid input parts 55 face one region (input region 60).

The transfer device (the liquid input part transfer device 47 and the solid input part transfer device 53) transfers the liquid input part 49 and the solid input part 55 in a state in which switching can be performed between a state in which the input region 60 is positioned on the above side of the stand 23 and a state in which it is positioned off the above side of the stand 23.

Figure 18:
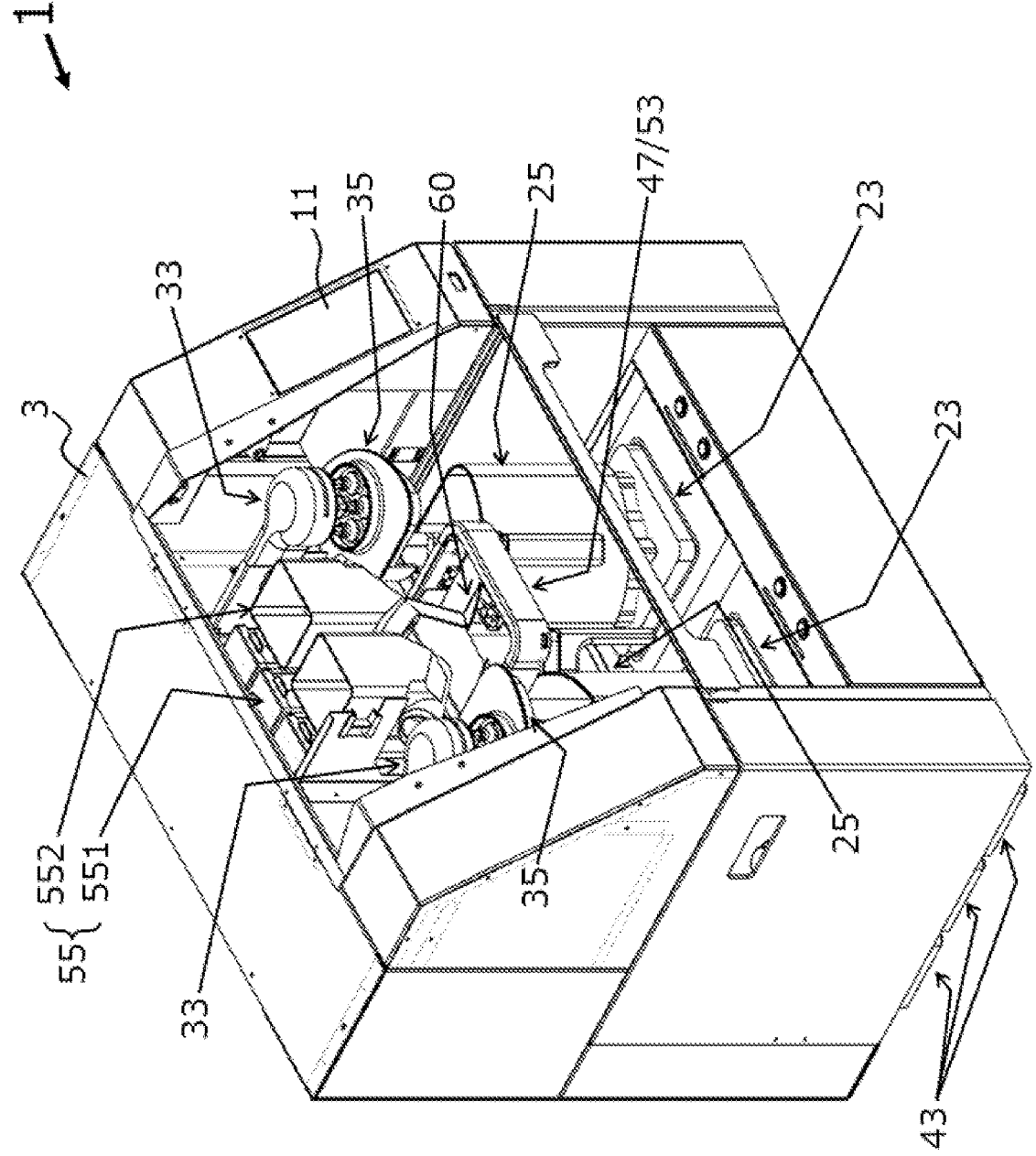
FIG. 18 is a perspective view illustrating an appearance and an internal structure of a beverage producing apparatus according to sixth to eleventh embodiments.
Figure 19:
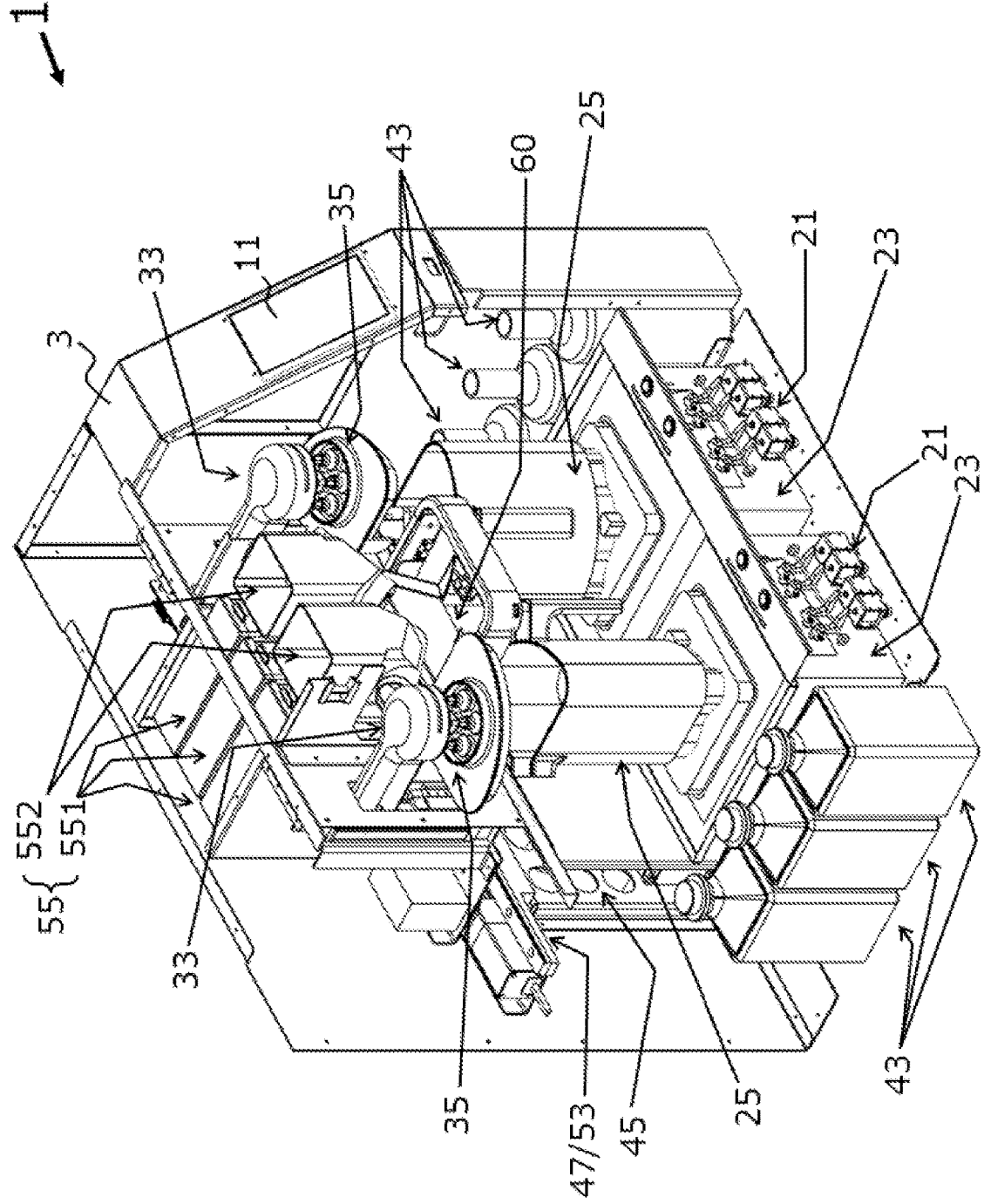
FIG. 19 is a perspective view illustrating the internal structure of the beverage producing apparatus according to the sixth to eleventh embodiments.

Note that, for description of the internal structure of the beverage producing apparatus 1, illustration of a part of the side wall of the housing 3 is omitted in FIG. 18 and FIG. 19.

(Effect of Integrally Transferring Liquid Input Part 49 and Solid Input Part 55)

By transferring the transfer device (the liquid input part transfer device 47 and the solid input part transfer device 53) such that said one region (input region 60) is positioned on the above side of the stand 23 that holds the bottle 25 to which the liquid and the like are to be input, it is possible to simultaneously input the liquid and the solid (powder and granule) to the bottle 25.

(Application Example of Providing a Plurality of Stands 23)

Next, a seventh embodiment will be described (see FIG. 16 to FIG. 19).

In the first embodiment, an example has been described in which only one stand 23 is provided.

However, a plurality of the stands 23 may be provided.

In the seventh embodiment, an example will be described in which two stands 23 are provided.

(Effect of Providing a Plurality of Stands 23 and the Like)

It is possible to perform cooking (pulverization or stirring) in the bottle 25 placed on one stand 23 while inputting the liquid and the like to the bottle 25 placed on the other stand 23.

(Application Example of Operation Direction of First Control Button 21a and the Like)

Figure 20:
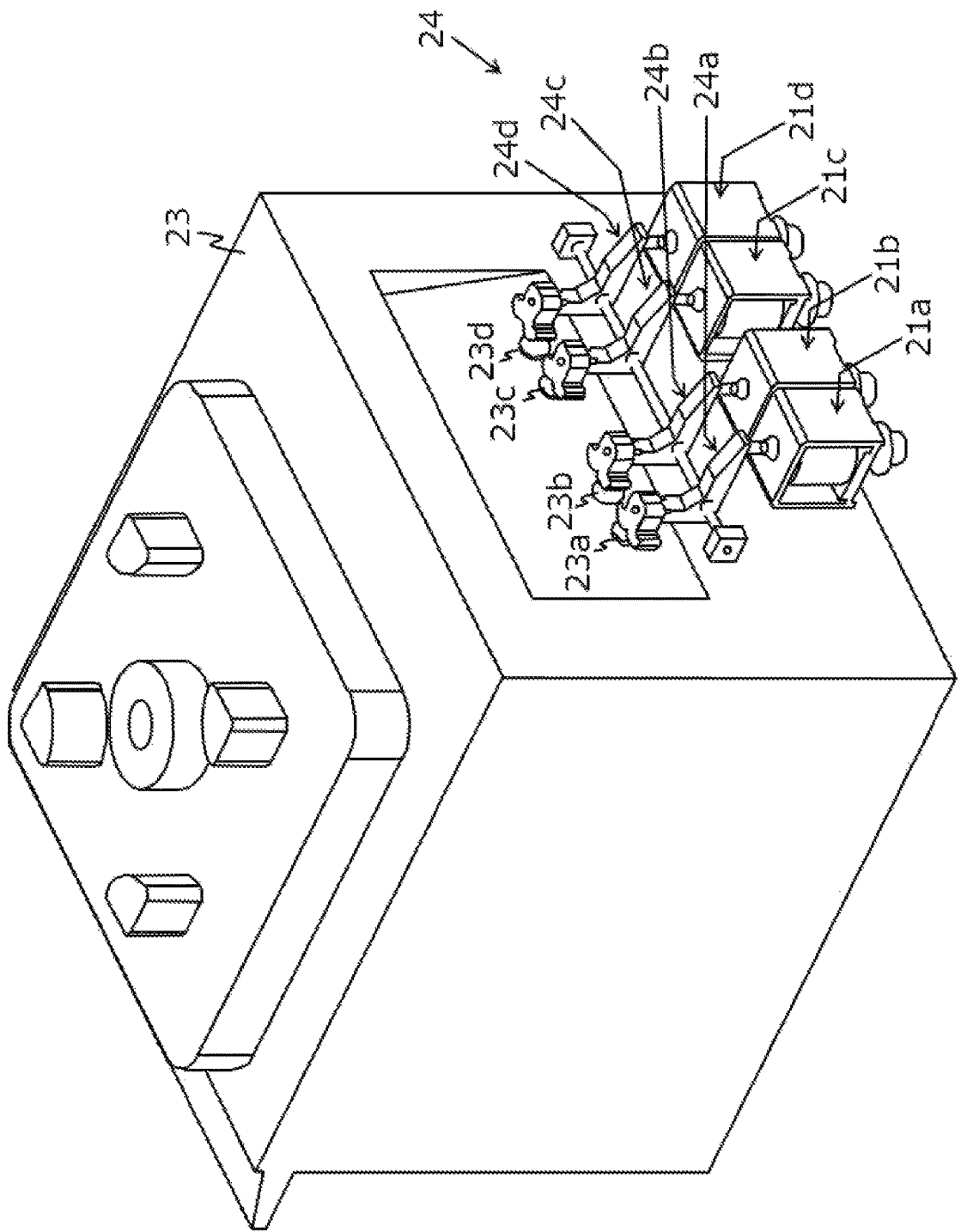
FIG. 20 is a perspective view of a stand, a mixer controller, and a transmission part according to the eighth embodiment.

Next, an eighth embodiment will be described (see FIG. 19 and FIG. 20).

In the first embodiment, an example has been described in which the first operation button 23a to the fourth operation button 23d are provided on the side surface of the stand 23, and the first control button 21a to the fourth control button 21d press down the first operation button 23a to the fourth operation button 23d.

However, a transmission part 24 (a first lever 24a to a fourth lever 24d) may be provided between the first control button 21a to the fourth control button 21d and the first operation button 23a to the fourth operation button 23d.

The transmission part 24 has the first lever 24a to the fourth lever 24d.

Each of the levers of the transmission part 24 is pressed down by the control button, and presses the operation button in a direction (horizontal direction) different from the direction (vertical direction) in which each of the levers of the transmission part 24 is pressed down by the control button.

When viewed from the side, the first lever 24a has a substantially L shape including a region extending in the horizontal direction and a region extending in the vertical direction.

The region, extending in the horizontal direction, of the first lever 24a has a region functioning as a point of force. The region, functioning as a point of force, of the first lever 24a faces the first control button 21a.

The region, extending in the vertical direction, of the first lever 24a has a region functioning as a point of action. The region, functioning as a point of action, of the first lever 24a faces the first operation button 23a.

A connection point between the region, extending in the horizontal direction, of the first lever 24*a* and the region, extending in the vertical direction, of the first lever 24*a* functions as a fulcrum of the lever of the first lever 24*a*.

A distance between the region functioning as a point of force and the region functioning as a fulcrum of the first lever 24*a* is larger than a distance between the region functioning as a point of action and the region functioning as a fulcrum of the first lever 24*a*.

The first control button 21*a* presses the region, functioning as a point of force, of the first lever 24*a* in the vertical direction.

The first lever 24*a* rotates about the fulcrum, and the point of action of the first lever 24*a* presses the first operation button 23*a* in the horizontal direction.

When viewed from the side, the second lever 24*b* has a substantially L shape including a region extending in the horizontal direction and a region extending in the vertical direction.

The region, extending in the horizontal direction, of the second lever 24*b* has a region functioning as a point of force. The region, functioning as a point of force, of the second lever 24*b* faces the second control button 21*b*.

The region, extending in the vertical direction, of the second lever 24*b* has a region functioning as a point of action. The region, functioning as a point of action, of the second lever 24*b* faces the second operation button 23*b*.

A connection point between the region, extending in the horizontal direction, of the second lever 24*b* and the region, extending in the vertical direction, of the second lever 24*b* functions as a fulcrum of the lever of the second lever 24*b*.

A distance between the region functioning as a point of force and the region functioning as a fulcrum of the second lever 24*b* is larger than a distance between the region functioning as a point of action and the region functioning as a fulcrum of the second lever 24*b*.

The second control button 21*b* presses the region, functioning as a point of force, of the second lever 24*b* in the vertical direction.

The second lever 24*b* rotates about the fulcrum, and the point of action of the second lever 24*b* presses the second operation button 23*b* in the horizontal direction.

When viewed from the side, the third lever 24*c* has a substantially L shape including a region extending in the horizontal direction and a region extending in the vertical direction.

The region, extending in the horizontal direction, of the third lever 24*c* has a region functioning as a point of force. The region, functioning as a point of force, of the third lever 24*c* faces the third control button 21*c*.

The region, extending in the vertical direction, of the third lever 24*c* has a region functioning as a point of action. The region, functioning as a point of action, of the third lever 24*c* faces the third operation button 23*c*.

A connection point between the region, extending in the horizontal direction, of the third lever 24*c* and the region, extending in the vertical direction, of the third lever 24*c* functions as a fulcrum of the lever of the third lever 24*c*.

A distance between the region functioning as a point of force and the region functioning as a fulcrum of the third lever 24*c* is larger than a distance between the region functioning as a point of action and the region functioning as a fulcrum of the third lever 24*c*.

The third control button 21*c* presses the region, functioning as a point of force, of the third lever 24*c* in the vertical direction.

The third lever 24*c* rotates about the fulcrum, and the point of action of the third lever 24*c* presses the third operation button 23*c* in the horizontal direction.

When viewed from the side, the fourth lever 24*d* has a substantially L shape including a region extending in the horizontal direction and a region extending in the vertical direction.

The region, extending in the horizontal direction, of the fourth lever 24*d* has a region functioning as a point of force. The region, functioning as a point of force, of the fourth lever 24*d* faces the fourth control button 21*d*.

The region, extending in the vertical direction, of the fourth lever 24*d* has a region functioning as a point of action. The region, functioning as a point of action, of the fourth lever 24*d* faces the fourth operation button 23*d*.

A connection point between the region, extending in the horizontal direction, of the fourth lever 24*d* and the region, extending in the vertical direction, of the fourth lever 24*d* functions as a fulcrum of the lever of the fourth lever 24*d*.

A distance between the region functioning as a point of force and the region functioning as a fulcrum of the fourth lever 24*d* is larger than a distance between the region functioning as a point of action and the region functioning as a fulcrum of the fourth lever 24*d*.

The fourth control button 21*d* presses the region, functioning as a point of force, of the fourth lever 24*d* in the vertical direction.

The fourth lever 24*d* rotates about the fulcrum, and the point of action of the fourth lever 24*d* presses the fourth operation button 23*d* in the horizontal direction.

(Effect of Converting Direction of Applying Force by Using Transmission Part 24)

The transmission part 24 converts a force for pushing in a different direction (vertical direction) into a force for pushing in the horizontal direction.

Therefore, the dimension, in the direction (horizontal direction) in which the operation button of the beverage producing apparatus 1 is pressed, can be made smaller than that in a form in which the transmission part 24 is not provided.

(Effect of Converting Direction of Applying Force by Using Lever of Transmission Part 24)

The lever of the transmission part 24 enables the operation button to be pressed down with a less force.

(Application Example of Solid Input Part 55)

Next, a ninth embodiment will be described (see FIG. 18, FIG. 19, and FIG. 21 to FIG. 23).

In the first embodiment, an example has been described in which two solid input parts 55 having the same shape are provided.

However, the solid input parts 55 having different shapes may be provided.

The solid input part 55 of the ninth embodiment has a powder input part 551 and a granule input part 552.

The powder input part 551 is used for inputting a solid (powder) that is a fine particle, and the granule input part 552 is used for inputting a solid (granule) that is a coarser particle than the powder to be used in the powder input part 551.

Figure 22:
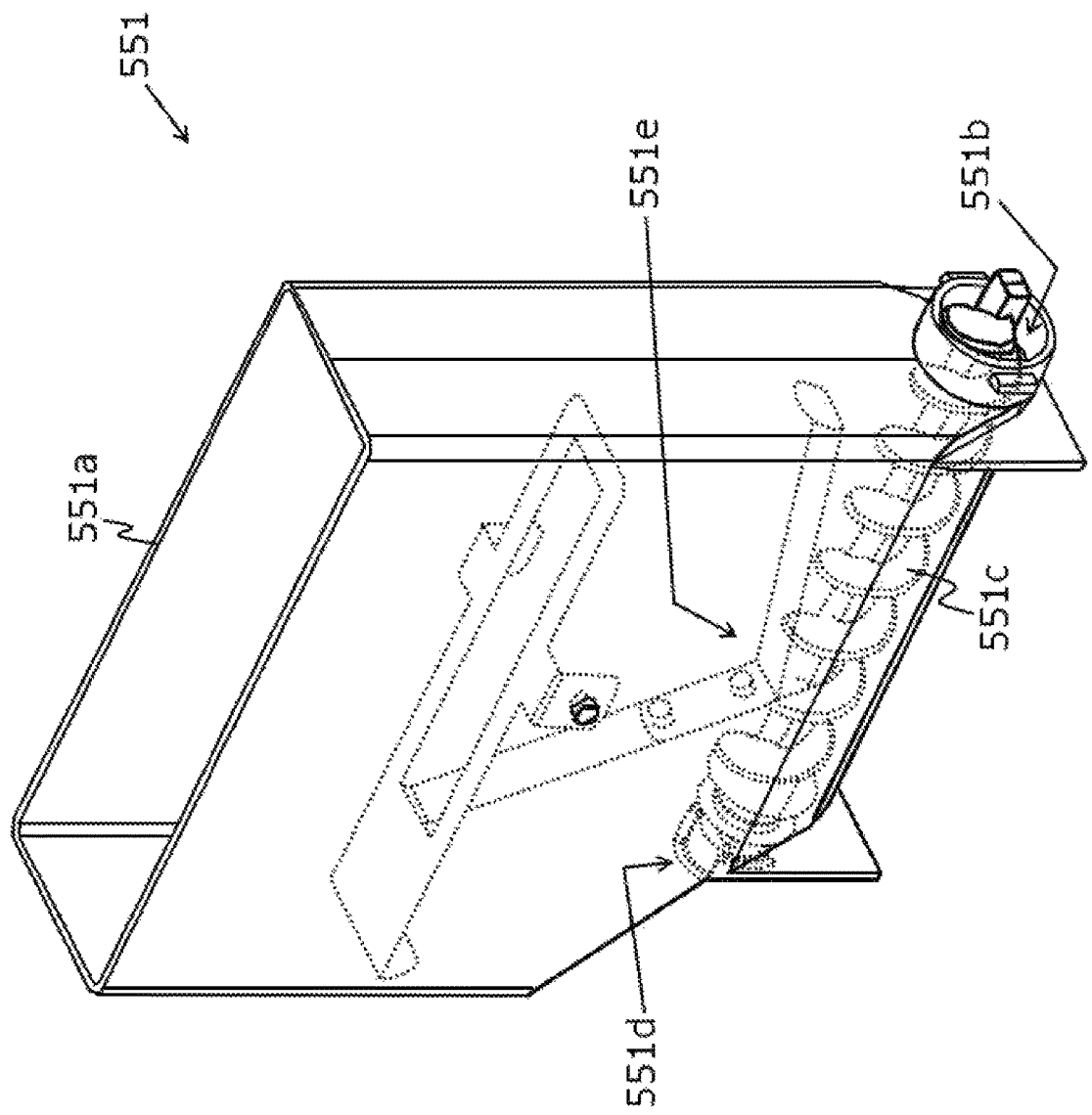
FIG. 22 is a perspective view of the powder input part according to the ninth embodiment.
Figure 23:
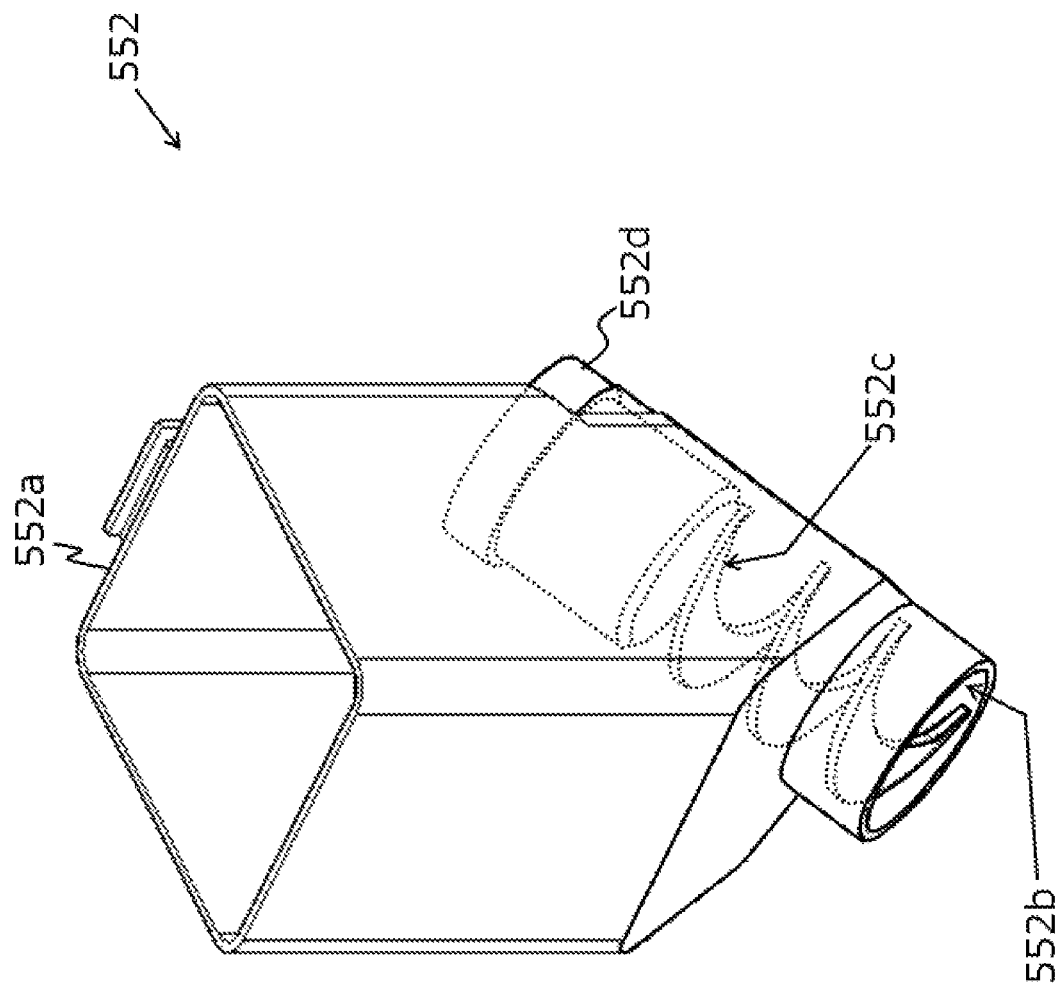
FIG. 23 is a perspective view of a granule input part according to the ninth embodiment.
Figure 24:
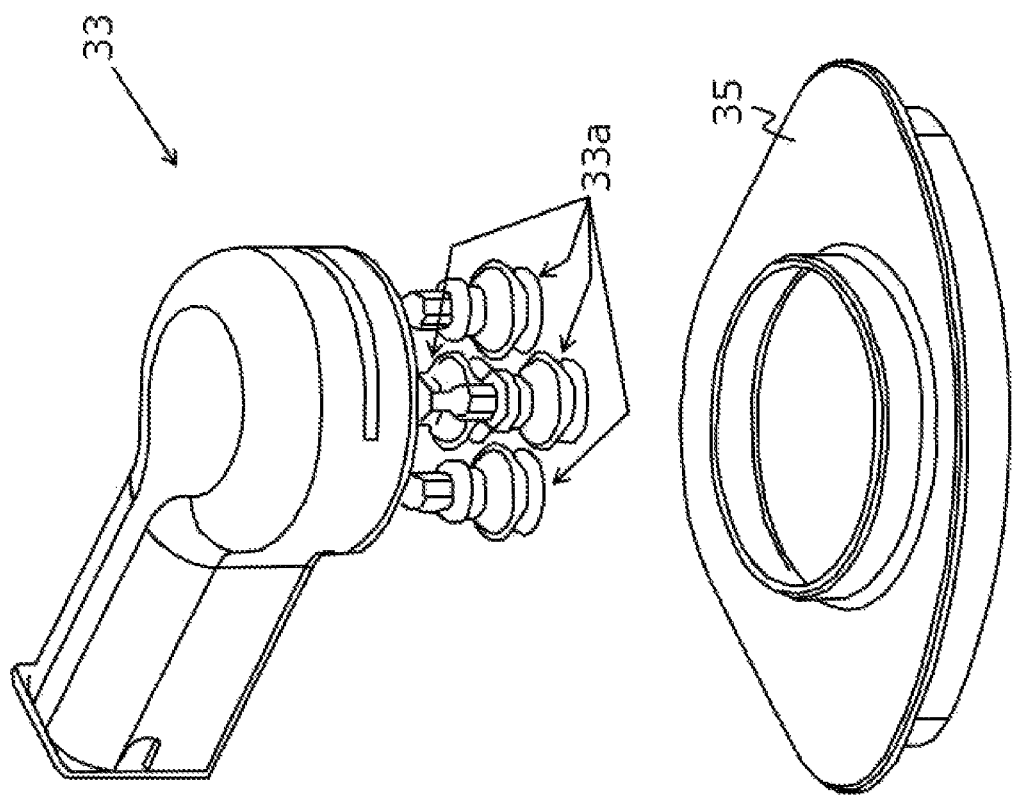
FIG. 24 is a perspective view of a lid transfer device (suction device) and a lid before the lid is sucked according to the tenth embodiment.
Figure 25:
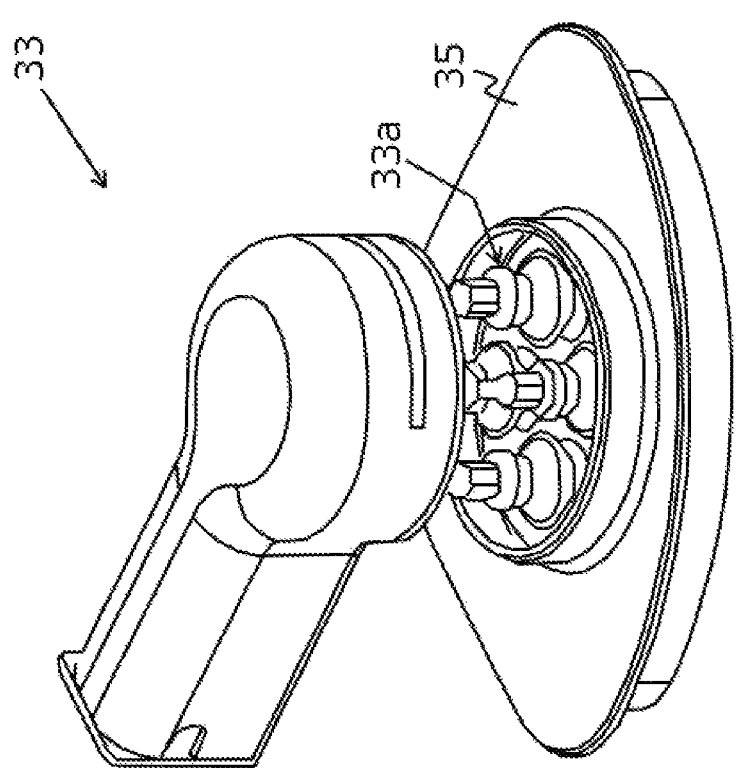
FIG. 25 is a perspective view of the lid transfer device (suction device) and the lid after the lid is sucked according to the tenth embodiment.
Figure 26:
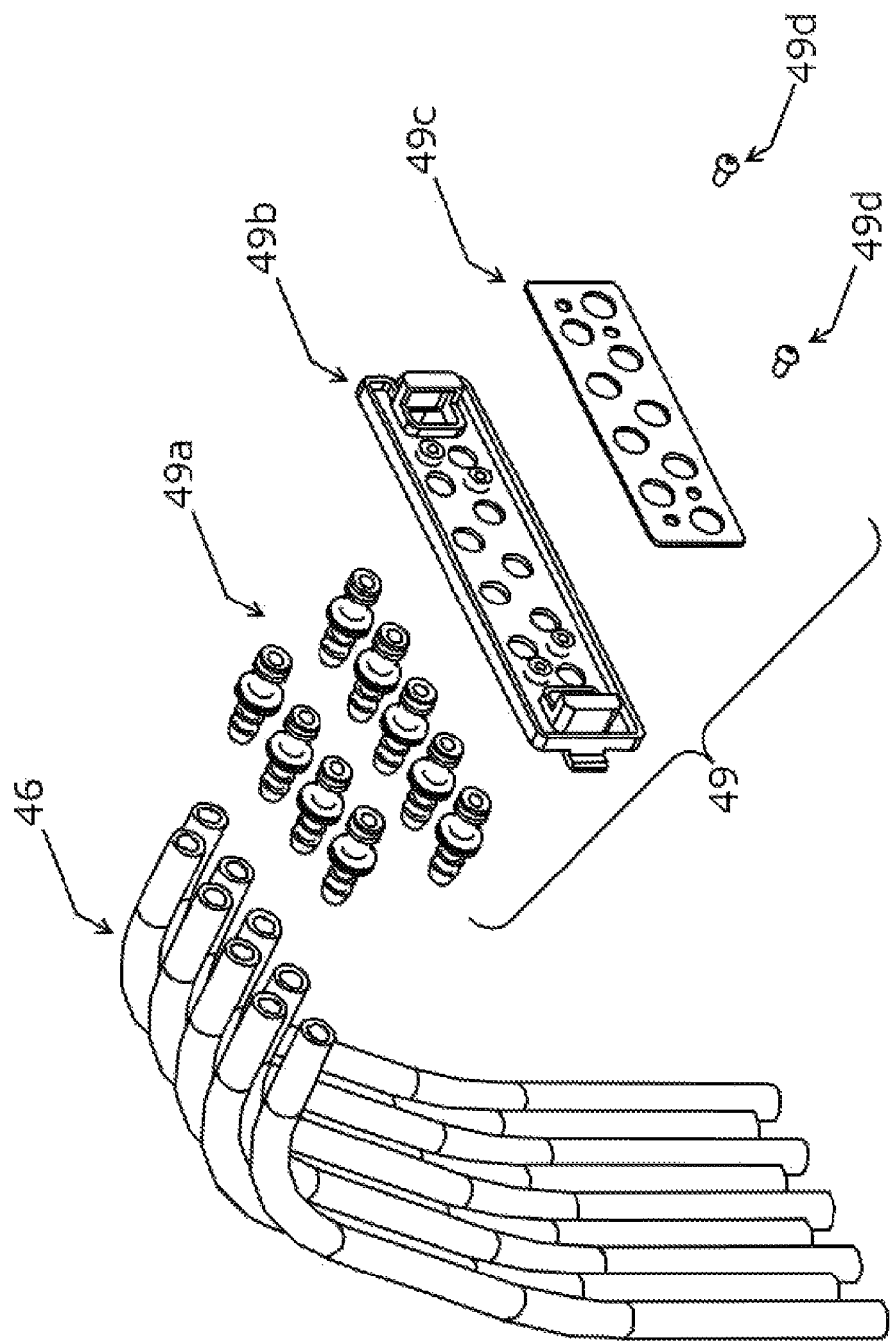
FIG. 26 is an exploded perspective view of a liquid input part according to the eleventh embodiment.
Figure 27:
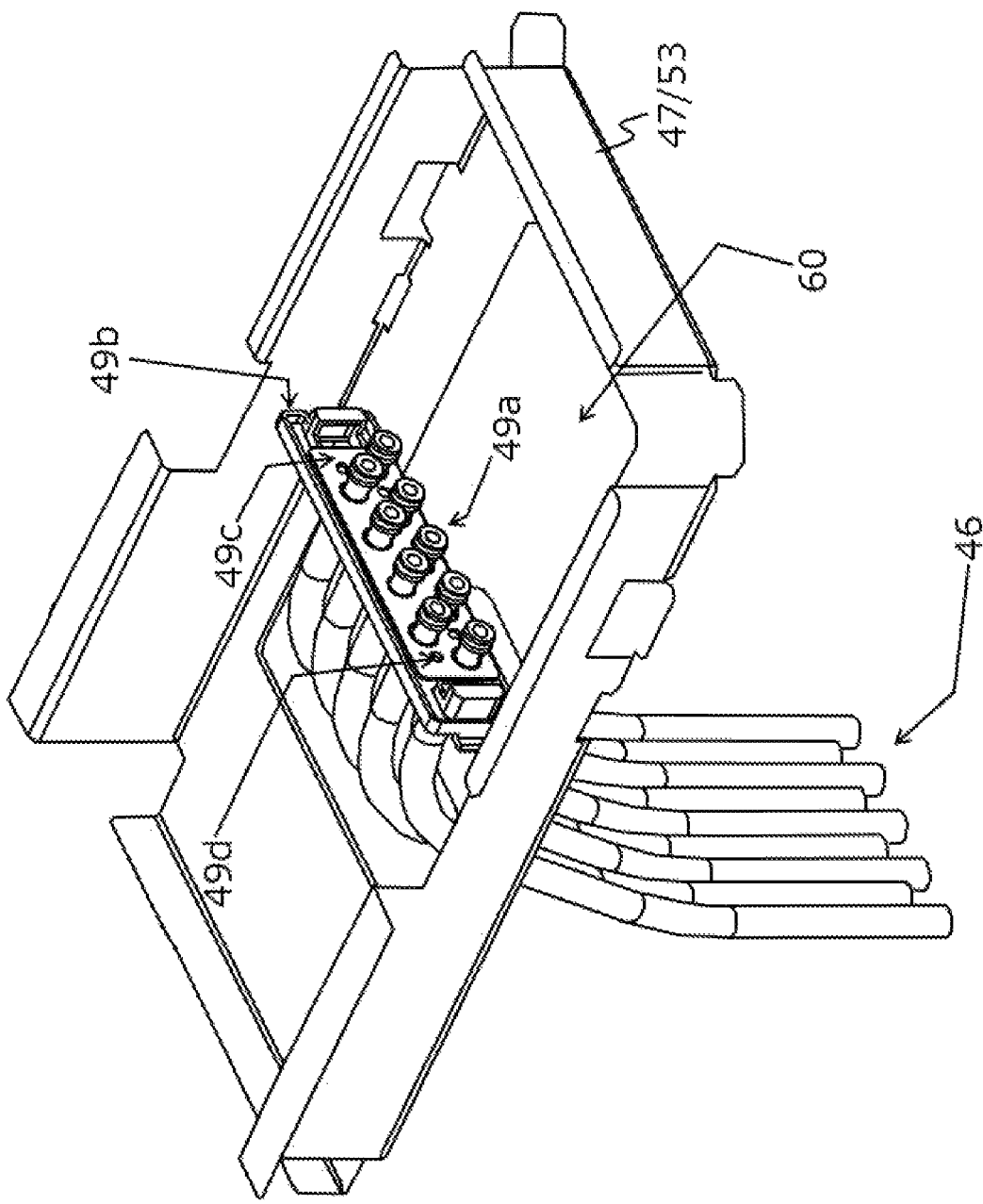
FIG. 27 is a perspective view of the liquid input part according to the eleventh embodiment.

In FIG. 22 and FIG. 23, a part of a portion invisible from the outside, such as a powder transfer spiral part 551*c*, is indicated by dotted lines for easy description of internal structure.

(Powder Input Part 551)

Figure 21:
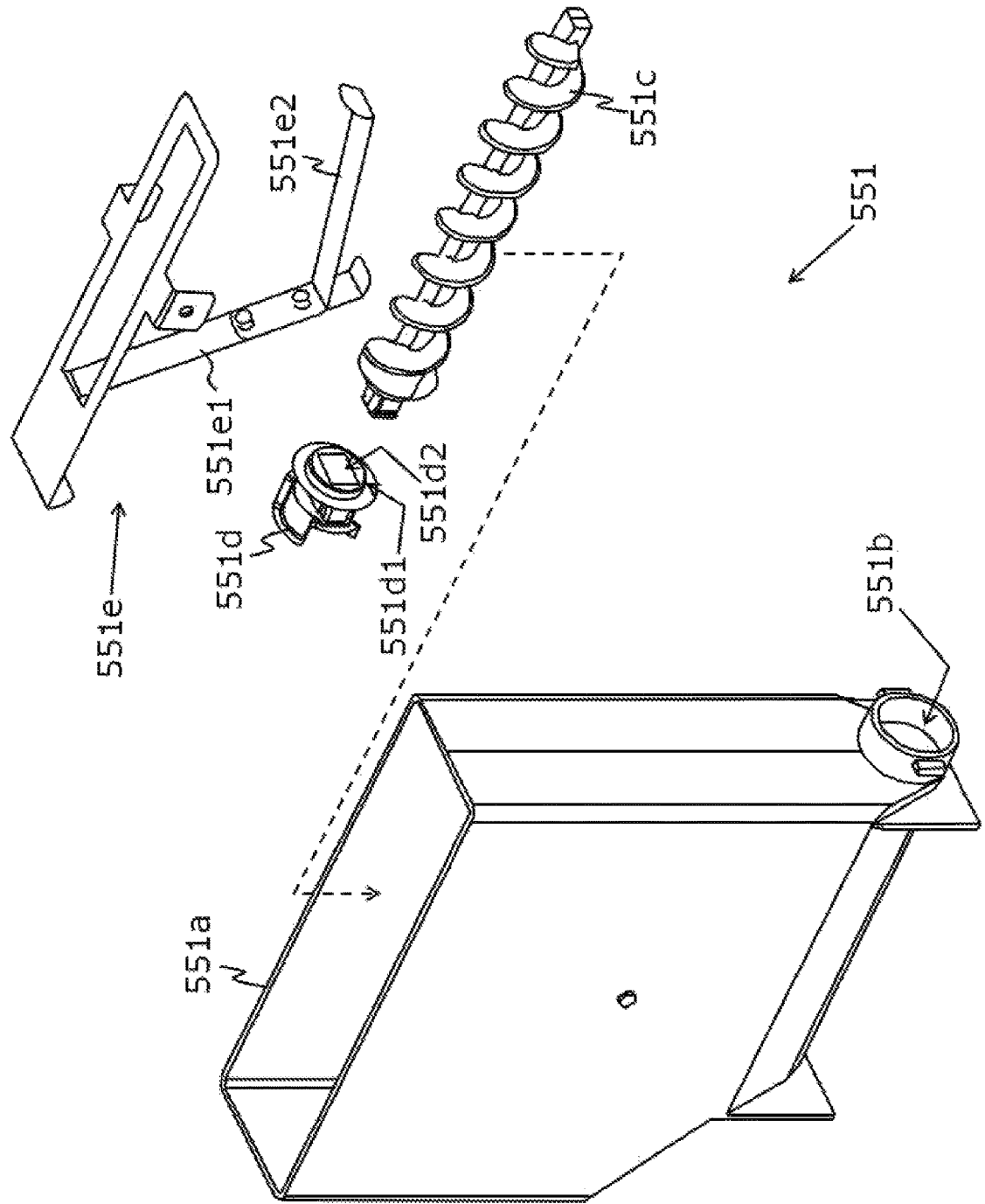
FIG. 21 is an exploded perspective view of a powder input part according to the ninth embodiment.

The powder input part 551 includes a powder case 551*a*, a powder discharge port 551*b*, the powder transfer spiral part 551c, a powder stirring part 551e, and a powder transfer power providing part 551d (see FIG. 21 and FIG. 22).

The powder case 551a contains powder such as matcha powder. The powder discharge port 551b is provided in a lower portion of the side surface of the powder case 551a.

The powder transfer spiral part 551c is provided in a lower portion inside the powder case 551a, and transfers the powder in a direction in which the powder discharge port 551b is positioned by the rotation of the spiral portion of the powder transfer spiral part 551c.

The powder transfer power providing part 551d supplies a rotational force to the powder transfer spiral part 551c.

A contact part 551d1 made of an elastic body, such as rubber, is provided in the powder transfer power providing part 551d. A recess 551d2, into which the rear end portion of the rotation shaft of the powder transfer spiral part 551c is fitted, is provided in the contact part 551d1.

The cross section of the recess 551d2 has substantially the same shape as the cross section of the rear end portion of the rotation shaft of the powder transfer spiral part 551c. If the rear end portion of the rotation shaft of the powder transfer spiral part 551c is inserted into the recess 551d2 in a state in which the rear end portion is not aligned, the rear end portion of the rotation shaft of the powder transfer spiral part 551c does not fit into the recess 551d2, and the contact part 551d1 is deformed. However, when the rotation shaft of the powder transfer spiral part 551c and the rotation shaft of the powder transfer power providing part 551d are on the same straight line, the rear end portion of the rotation shaft of the powder transfer spiral part 551c fits into the recess 551d2 by rotating the powder transfer power providing part 551d, whereby alignment is completed. After the alignment is completed, the rotational force of the powder transfer power providing part 551d is transmitted to the powder transfer spiral part 551c.

(Effects of Providing Contact Part 551d1 Made of Elastic Body)

Even in a state in which the fitting between the powder transfer power providing part 551d and the powder transfer spiral part 551c is not tightly created, a state of being fitted to each other can be created by rotating the powder transfer power providing part 551d. In addition, even in a state in which the fitting is not created, the contact part 551d1 is only elastically deformed and is not damaged because the contact part 551d1 is made of an elastic body. Therefore, the powder transfer power providing part 551d and the powder transfer spiral part 551c can be easily coupled.

In the powder stirring part 551e, an elastic member 551e1, such as a leaf spring, comes into contact with the spiral portion of the powder transfer spiral part 551c, the contact place between the elastic member 551e1 and the spiral portion of the powder transfer spiral part 551c is displaced by the rotation of said spiral portion, and the elastic member 551e1 is lifted upward. The elastic member 551e1 returns to a position where it comes into contact with the spiral portion of the powder transfer spiral part 551c again by a biasing force.

(Effect of Providing Elastic Member 551e1 in Contact with Powder Transfer Spiral Part 551c)

When the elastic member 551e1 is lifted up, and when it returns to a position where it comes into contact with the spiral portion of the powder transfer spiral part 551c, the elastic member 551e1 and a stirring arm part 551e2 extending from the elastic member 551e1 stir the powder around them.

(Granule Input Part 552)

The granule input part 552 includes a granule case 552a, a granule discharge port 552b, a granule transfer spiral part 552c, and a granule transfer power providing part 552d (see FIG. 23).

The granule case 552a contains a granule such as a chocolate chip. The granule discharge port 552b is provided in a lower portion of the side surface of the granule case 552a.

The granule transfer spiral part 552c is provided in a lower portion inside the granule case 552a, and transfers the granule in a direction in which the granule discharge port 552b is positioned by the rotation of the spiral portion of the granule transfer spiral part 552c.

The granule transfer power providing part 552d supplies a rotational force to the granule transfer spiral part 552c.

When a load for rotating the granule transfer spiral part 552c exceeds a predetermined amount, the granule transfer power providing part 552d stops, rotates reversely, and rotates forward.

(Effects of Performing Reverse Rotation Control Depending on Load)

When the load is large, it stops, rotates reversely, and then rotates forward again. As a result, it is possible to prevent the granule from being caught by the granule transfer spiral part 552c or the granule case 552a and being pulverized.

(Setting of Rotation Amount)

The recording device 13a records, per unit weight, a rotation amount (first rotation amount rv1) of the powder transfer power providing part 551d and a rotation amount (second rotation amount rv2) of the granule transfer power providing part 552d.

For example, when the powder transfer power providing part 551d is rotated five turns in order to discharge 1 gram of the powder from the powder discharge port 551b, the first rotation amount rv1 is assumed to be 5.

When only 2 grams of the powder are discharge from the powder discharge port 551b in order to produce a large volume of the first beverage, the powder transfer power providing part 551d is rotated ten turns.

(Operation Correction Control of Powder Input Part 551)

It is desirable that, when the beverage producing apparatus 1 is installed or every lapse of a third time t3 (e.g., t3=10 days), operation correction control of the powder input part 551, that is, adjustment of the first rotation amount rv1 is performed.

In the operation correction control, the powder transfer power providing part 551d is rotated by the first rotation amount rv1 in a state in which the powder case 551a is filled with the powder, and the powder transfer spiral part 551c discharges the powder from the powder discharge port 551b.

The weight of the powder discharged from the powder discharge port 551b is measured. For the measurement, said sensor 80 may be used, or another weight measuring device may be used.

The first rotation amount rv1 is corrected on the basis of the ratio of the measured weight to the unit weight.

When the measured weight is twice the unit weight, it is assumed that the discharge amount of the powder is large. As a result, the first rotation amount rv1 is corrected to ½ of the value before correction (rv1=2.5 after correction with respect to rv1=5 before correction).

When the measured weight is ⅓ of the unit weight, it is assumed that the discharge amount of the powder is small. As a result, the first rotation amount rv1 is corrected to three times the value before correction (rv1=15 after correction with respect to rv1=5 before correction).

The information on the measured weight is input via the fifth output part 12e or the like by a user, and the controller 13 adjusts the first rotation amount rv1 on the basis of the information on said measured weight.

When the sensor 80 performs said measurement, the controller 13 may adjust the first rotation amount rv1 on the basis of the information obtained by the sensor 80 (information on said measured weight) without performing input via the fifth output part 12e or the like.

This makes it possible to adjust the amount of the powder to be discharged from the powder input part 551 depending on an individual difference of the powder input part 551 or the like.

It is also desirable that further operation correction control, that is, the fine adjustment of the first rotation amount rv1 is performed every lapse of a fourth time t4 (e.g., t4=3 hours) shorter than the third time t3.

Specifically, further operation correction control is performed on the basis of air temperature, humidity, the amount of the powder filling the powder case 551a, and the like.

The information on the temperature and the humidity may be measured by the sensors 80 or may be measured by another measuring device.

For example, when the humidity is high, and when the amount of the powder filling the powder case 551a is large, the powder harden and is difficult to be discharged, so that the first rotation amount rv1 is set to a value larger than the value before the fine adjustment.

As a result, it is possible to finely adjust the amount of the powder to be discharged from the powder input part 551 depending on the surrounding conditions or the like.

(Operation Correction Control of Granule Input Part 552)

Similarly, it is desirable that, when the beverage producing apparatus 1 is installed or every lapse of the third time t3, operation correction control of the granule input part 552, that is, adjustment of the second rotation amount rv2 is performed.

It is also desirable that, every lapse of the fourth time t4, further operation correction control, that is, fine adjustment of the second rotation amount rv2 is performed.

That is, by rotating the transfer power providing parts (powder transfer power providing part 551d, granule transfer power providing part 552d) by rotation amounts (first rotation amount rv1, second rotation amount rv2) corresponding to the unit weight, the controller 13 adjusts said rotation amounts (first rotation amount rv1, second rotation amount rv2) on the basis of the ratio of the weight (actual weight) of the discharged powder or granule to the unit weight.

On the basis of the information on at least one of the amount of the powder or granule contained in the case (powder case 551a, granule case 552a) of the solid input part 55, the air temperature around said case, and the humidity around said case, the controller 13 adjusts said rotation amounts (first rotation amount rv1, second rotation amount rv2).

(Application Example of Lid Transfer Device 33)

Next, a tenth embodiment will be described (see FIG. 18, FIG. 19, FIG. 24, and FIG. 25).

In the first embodiment, an example has been described in which the groove-shaped portion of the lid transfer device 33 holds the edge of the lid 35.

However, the form in which the lid transfer device 33 holds the lid 35 is not limited thereto.

For example, the lid transfer device 33 may hold the lid 35 by suction with a vacuum pump.

In this case, the lid transfer device 33 has a suction device for the lid 35.

Only one suction device for the lid 35 may be provided, or a plurality of suction devices may be provided.

It is desirable that the lid 35 can be held by using, of the plurality of suction devices, one or more suction devices, not all of them.

In the tenth embodiment, it is configured that four suction devices for the lid 35 are provided and the lid 35 can be held by using one, two, or three of them.

(Effect of Using Plurality of Suction Devices)

Even if the lid 35 is wet and some of the plurality of suction devices cannot sufficiently perform suction, it is possible to maintain the holding of the lid 35 by the other suction devices.

(Application Example of Liquid Input Part 49)

Next, an eleventh embodiment will be described (see FIG. 18, FIG. 19, FIG. 26, and FIG. 27).

The liquid input part 49 may include a nozzle holding part 49b, a washer 49c, and a screw 49d in addition to the nozzle 49a.

The nozzle holding part 49b has a hole through which the tip portion of the nozzle 49a passes, and holds the nozzle 49a.

The nozzle holding part 49b is held by a part in which the liquid input part transfer device 47 and the solid input part transfer device 53 are integrally configured.

The washer 49c is formed of a plate-shaped member having a hole through which the tip portion of the nozzle 49a passes, and is attached to the nozzle holding part 49b.

The screw 49d is used to fix the washer 49c and the nozzle holding part 49b to the part in which the liquid input part transfer device 47 and the solid input part transfer device 53 are integrally configured.

(Application example 1 of cooperation with external Equipment)

Figure 28:
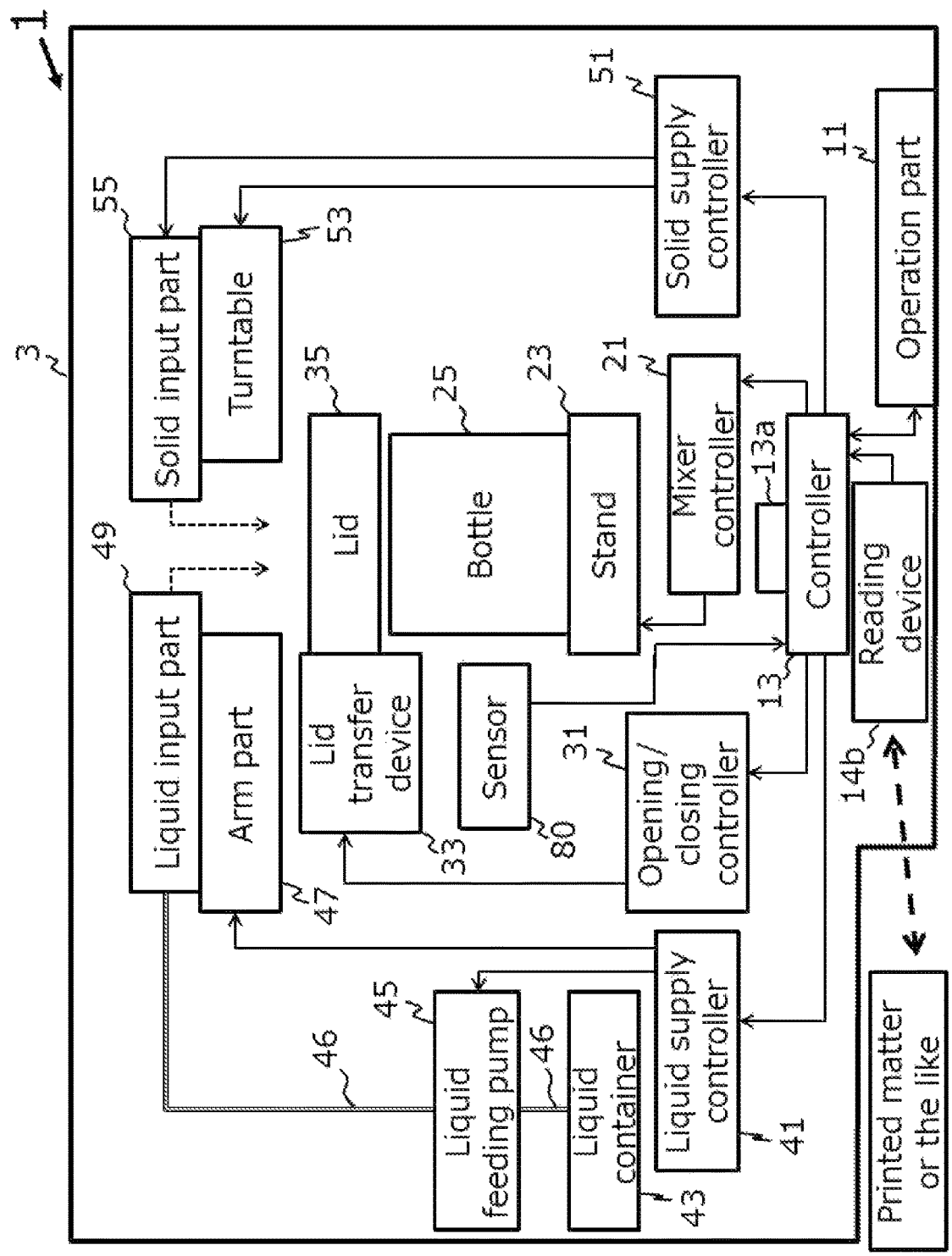
FIG. 28 is a configuration view illustrating respective members of a beverage producing apparatus according to a twelfth embodiment.

Next, a twelfth embodiment will be described (see FIG. 28).

In the second embodiment, an example has been described in which the external equipment cooperation part has the communication device 14a, the communication device 14a receives, from the external equipment, order information on the beverage to be produced by the beverage producing apparatus 1, and the operation part 11 outputs information on the beverage to be produced next by the beverage producing apparatus 1.

However, a form may be adopted in which the external equipment cooperation part has a reading device 14b such as a scanner, and the reading device 14b reads an output from the external equipment (execute a reading step).

Said output from the external equipment includes a paper medium including a barcode printed by the register 70 or the like, an image displayed on a mobile terminal or the like, or the like. Said barcode includes order information on the beverage to be produced by the beverage producing apparatus 1.

Specifically, of the first output part 12a to the fourth output part 12d, an output part corresponding to the button of the operation part 11 corresponding to the beverage to be produced next by the beverage producing apparatus 1 is turned on, on the basis of said order information included in the information read by the reading device 14b. In a case where a plurality of the stands 23 are provided, the first output part 12a or the like corresponding to the stand 23, on which the bottle 25 to which the liquid or the like is to be input is placed, is turned on.

However, in addition to/instead of lighting of any one of the first output part 12a to the fourth output part 12d, the controller 13 may cause the fifth output part 12e to output "information on the beverage to be produced next by the beverage producing apparatus 1" by voice or video. In a case where the fifth output part 12e is configured by the touch panel on the display device, an operation, such as input of the liquid to the bottle 25 placed on the stand 23, may be started when a user touches a "confirmation button" displayed on the fifth output part 12e.

(Effect of Providing Reading Device 14b)

By reading the order information, such as the type of the beverage to be produced next, from the barcode or the like output from the external equipment such as a register 70, it is possible for an error, in setting the beverage to be produced next by the beverage producing apparatus 1, to hardly occur.

(Application Example of Providing Multiple Sets of Liquid Input Parts 49 and Solid Input Parts 55)

Next, a thirteenth embodiment will be described.

In the first embodiment, an example has been described in which one set of the liquid input part 49 and the solid input part 55 is provided.

Figure 29:
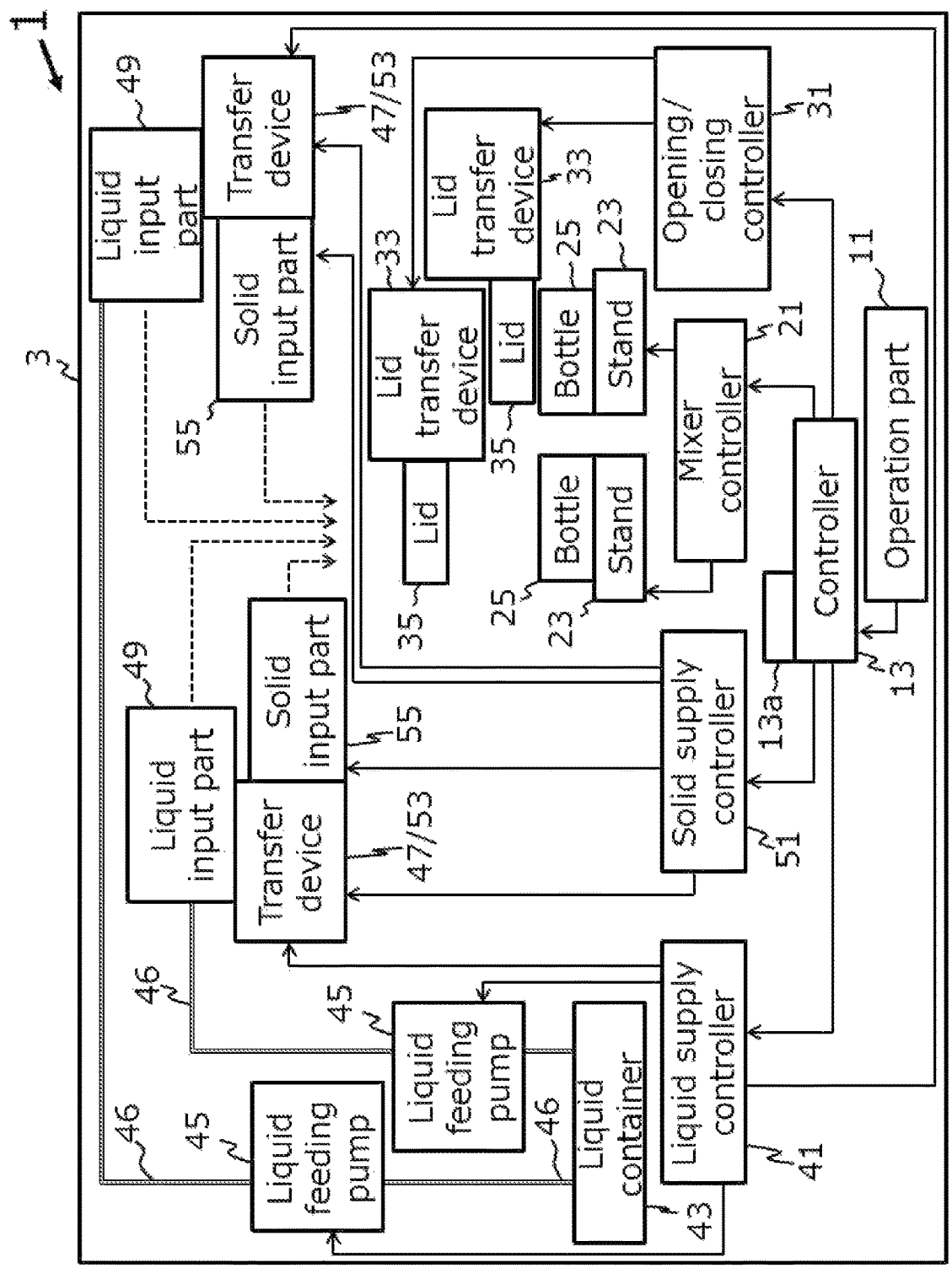
FIG. 29 is a configuration view illustrating respective members of a beverage producing apparatus according to a thirteenth embodiment.

However, multiple sets of the liquid input parts 49 and the solid input parts 55 may be provided (see FIG. 29).

(Application Example 2 of Cooperation with External Equipment)

Next, a fourteenth embodiment will be described.

In the second embodiment, an example has been described in which the communication device 14a receives the order information on the beverage to be produced by the beverage producing apparatus 1, the operation part 11 outputs the information on the beverage to be produced next on the basis of said order information, and after a user operates the operation part 11, the liquid is input to the bottle 25 placed on the stand 23.

That is, in the second embodiment, the input step is executed on the basis of the order information received by the communication device 14a and the operation state of the operation part 11. In addition, the lid retreat step is executed after the receiving step and the operating step and before the input step.

In the twelfth embodiment, an example has been described in which the reading device 14b reads the order information on the beverage to be produced by the beverage producing apparatus 1, the operation part 11 outputs the information on the beverage to be produced next on the basis of said order information, and after a user operates the operation part 11, input of the liquid to the bottle 25 placed on the stand 23, and the like are performed.

That is, in the twelfth embodiment, the input step is executed on the basis of the order information read by the reading device 14b and the operation state of the operation part 11. In addition, the lid retreat step is executed after the reading step and the operating step and before the input step.

However, said output of the information on the beverage to be produced next, said operation of the operation part 11 by a user, and the like may be omitted.

In the fourteenth embodiment, when the communication device 14a receives said order information from the external equipment or when the reading device 14b reads a printed matter or the like including said order information, and when an empty bottle 25 is placed on the stand 23, input of the liquid to the bottle 25 placed on the stand 23, and the like are performed.

That is, in the fourteenth embodiment, the input step is executed on the basis of the order information received by the communication device 14a or read by the reading device 14b. The lid retreat step is executed after the receiving step or the reading step and before the input step. In this case, the controller 13 determines whether an empty bottle is placed on stand 23 on the basis of the information detected by the sensor 80.

Although some embodiments of the present invention have been described, these embodiments have been presented as examples, and are not intended to limit the scope of the invention. These embodiments can be implemented in various other forms, and various omissions, replacements, and alterations can be made without departing from the gist of the invention. These embodiments and modifications thereof are included in the scope and gist of the invention and are included in the inventions described in the claims and the equivalent scopes thereof.

REFERENCE SIGNS LIST 1 beverage producing apparatus
3 housing
3a first door
3b second door
3c third door
11 operation part
11a first button
11b second button
11c third button
11d fourth button
12a first output part
12b second output part
12c third output part
12d fourth output part
12e fifth output part
13 controller
13a recording device
14a communication device
14b reading device
21 mixer controller
21a first control button
21b second control button
21c third control button
21d fourth control button
22 bottle transfer device
23 stand
23a first operation button
23b second operation button
23c third operation button
23d fourth operation button
24 transmission part
24a first lever
24b second lever
24c third lever
24d fourth lever
25 bottle
31 opening/closing controller
33 lid transfer device
33a lid holding part
33a1 upper surface
33a2 lower surface
33a3 vertical surface (connection surface)
35 lid
41 liquid supply controller
43 liquid container
44 cleaning water container
45 liquid feeding pump
46 liquid feeding tube 47 liquid input part transfer device
48 waste liquid container
49 liquid input part
49a nozzle
49b nozzle holding part
49c washer
49d screw
51 solid supply controller
53 solid input part transfer device
55 solid input part
55a first solid input part
55b second solid input part
551 powder input part
551a powder case
551b powder discharge port
551c powder transfer spiral part
551d powder transfer power providing part
551e powder stirring part
551e1 elastic member
551e2 stirring arm part
552 granule input part
552a granule case
552b granule discharge port
552c granule transfer spiral part
552d granule transfer power providing part
56 shooter
56a first input port
56b first discharge port
57 passage part
57a second input port
57b second discharge port
58 fixed amount holding part (holding part)
58a third input port
58b third discharge port
58c hole
59 holding part transfer device
60 input region
70 register
80 sensor
rv1 first rotation amount
rv2 second rotation amount
t1 first time (time during which fixed amount holding part remains at second position)
t2 second time (rotation time of motor)
t3 third time (time interval between adjustments of first rotation amount and second rotation amount)
t4 fourth time (time interval between fine adjustments of first rotation amount and second rotation amount)

The invention claimed is:

1. A beverage producing apparatus comprising:
a mixer having a stand, a bottle that is detachably placed on the stand, and a lid that closes an upper portion of the bottle;
a mixer controller that operates an operation button of the stand;
a liquid provider that inputs a liquid from an above side of the bottle attached to the stand;
a solid provider that inputs powder or a granule from an above side of the bottle attached to the stand;
a lid holder that holds the lid in a state, in which the lid is transferable at least between an above side of the bottle and a position off the above side of the bottle;
at least one of an operation selector that is used to select at least either of a type and an amount of a beverage to be produced by the mixer, a communicator including a receiver that receives order information on the beverage to be produced by the mixer, and a scanner that reads the order information; and
a housing that holds the stand, the liquid provider, the solid provider, the lid holder, and at least one of the operation selector, the communicator, and the scanner, wherein
in a case where the beverage producing apparatus comprises the operation selector, input of the liquid to the bottle via the liquid provider, input of the powder or the granule to the bottle via the solid provider, and operation controls of the lid holder and the mixer controller are performed on the basis of at least an operation state of the operation selector,
in a case where the beverage producing apparatus comprises the communicator, input of the liquid to the bottle via the liquid provider, input of the powder or the granule to the bottle via the solid provider, and operation controls of the lid holder and the mixer controller are performed on the basis of at least the order information received by the communicator, and
in a case where the beverage producing apparatus comprises the scanner, input of the liquid to the bottle via the liquid provider, input of the powder or the granule to the bottle via the solid provider, and operation controls of the lid holder and the mixer controller are performed on the basis of at least the order information read by the scanner.

2. The beverage producing apparatus according to claim 1, wherein
the solid provider has a granule input part that inputs the granule,
the granule input part has a granule transfer spiral part that transfers the granule by rotation of a spiral portion, and a granule transfer power providing part that supplies a rotational force to the granule transfer spiral part, and
when a load for rotating the granule transfer spiral part exceeds a predetermined amount, the granule transfer power providing part stops, rotates reversely, and rotates forward.

3. The beverage producing apparatus according to claim 2, wherein
the solid provider has a powder input part that inputs the powder,
the powder input part has a powder transfer spiral part that transfers the powder by rotation of a spiral portion, a powder transfer power providing part that supplies a rotational force to the powder transfer spiral part, and a powder stirring part including an elastic member and an arm part extending from the elastic member, and
the elastic member comes into contact with the spiral portion of the powder transfer spiral part by being biased, a contact place between the elastic member and the spiral portion of the powder transfer spiral part is displaced by the rotation of the spiral portion of the powder transfer spiral part, and the elastic member and the arm part stir the powder.

4. The beverage producing apparatus according to claim 3, wherein
a contact part made of an elastic body is provided in the powder transfer power providing part, and
a recess, into which an end portion of a rotation shaft of the powder transfer spiral part is fitted, is provided in the contact part.

5. The beverage producing apparatus according to claim 1, wherein
the solid provider has a transfer spiral part that transfers the granule or the powder by rotation of a spiral portion, and a transfer power providing part that supplies a rotational force to the transfer spiral part, the beverage producing apparatus comprises a controller and a recorder that records, per unit weight, a rotation amount of the transfer power providing part, and by rotating the transfer power providing part by a rotation amount corresponding to the unit weight, the controller adjusts the rotation amount on the basis of a ratio of the weight of the granule or powder discharged to the unit weight.

6. The beverage producing apparatus according to claim 5, wherein the controller adjusts the rotation amount on the basis of information on at least one of an amount of the granule or the powder contained in the solid provider, air temperature, and humidity.

7. The beverage producing apparatus according to claim 1, comprising a transmission part, wherein the mixer controller has a control button, the transmission part presses the operation button on the basis of a force applied from the control button, a direction, in which the control button presses the transmission part, is a vertical direction, and a direction, in which the transmission part presses the operation button, is a horizontal direction.

8. The beverage producing apparatus according to claim 7, wherein the transmission part has a lever, the lever includes a region extending in the horizontal direction and a region extending in the vertical direction, the region extending in the horizontal direction has a region that faces the control button and functions as a point of force, and the region extending in the vertical direction has a region that faces the operation button and functions as a point of action, a connection point between the region extending in the horizontal direction and the region extending in the vertical direction functions as a fulcrum, and a distance between the region functioning as a point of force and the region functioning as a fulcrum is larger than a distance between the region functioning as a point of action and the region functioning as a fulcrum.

9. The beverage producing apparatus according to claim 1, comprising the scanner, wherein the scanner reads a barcode including the order information.

10. The beverage producing apparatus according to claim 1, wherein two or more sets of the stands, the mixer controllers, and the lid holders are provided, and one or more sets of the liquid providers and the solids providers are provided.

11. The beverage producing apparatus according to claim 1, wherein the liquid provider and the solid provider are disposed such that a tip portion of a nozzle of the liquid provider, a discharge port for the powder of the solid provider, and a discharge port for the granule of the solid provider face one region, and a transfer device is provided, the transfer device transferring the liquid provider and the solid provider in a state, in which switching is performed between a state in which the one region is positioned on an above side of the stand and a state in which the one region is positioned off the above side of the stand.

12. The beverage producing apparatus according to claim 1, wherein the lid holder includes a plurality of suction devices that hold the lid, and the lid is held by using, of the plurality of suction devices, one or more suction devices, not all of them.

13. The beverage producing apparatus according to claim 1, comprising:

a liquid provider transfer device that holds the liquid provider in a state in which a liquid discharge port, from which the liquid is discharged, of the liquid provider is transferrable at least between an above side of the bottle and a position off the above side of the bottle; and a solid provider transfer device that holds the solid provider in a state in which a solid discharge port, from which the powder or the granule is discharged, of the solid provider is transferable at least between an above side of the bottle and a position off the above side of the bottle.

14. The beverage producing apparatus according to claim 13, comprising a waste liquid container, wherein when cleaning water is caused to flow through the liquid provider, the liquid provider transfer device positions the liquid discharge port on an above side of the waste liquid container.

15. The beverage producing apparatus according to claim 13, comprising:

a liquid container that stores the liquid; and a liquid feeding pump that is attached to the liquid container and discharges the liquid in the liquid container by being pressing down at an upper end portion, wherein a tip portion of the liquid feeding pump functions as the liquid provider, and the upper end portion of the liquid feeding pump is pressed down in a state in which the bottle is positioned on the under side of the liquid discharge port.

16. The beverage producing apparatus according to claim 1, wherein the solid provider has a shooter that holds the powder or the granule, and a holding part, the holding part is transferable between a first position and a second position, and when positioned at the first position, the holding part receives supply of the powder or the granule from the shooter, and when positioned at the second position, the holding part discharges the powder or the granule for inputting to the bottle.

17. The beverage producing apparatus according to claim 1, wherein in a case where the beverage producing apparatus comprises the communicator, the operation selector outputs information on a beverage to be produced next on the basis of at least the order information received by the communicator, and in a case where the beverage producing apparatus comprises the scanner, the operation selector outputs information on a beverage to be produced next on the basis of at least the order information read by the scanner.

18. The beverage producing apparatus according to claim 1, comprising a sensor that acquires information on at least either of a type and an amount of a material input to the bottle, wherein information on whether the type and amount of the beverage that is produced from the type and amount, which are specified on the basis of the information acquired by the sensor, of the material input to the bottle and the type and amount of the beverage selected via the operation selector match is output.

19. The beverage producing apparatus according to claim 1, comprising a bottle transfer device that holds the bottle in a state, in which the bottle is transferable at least among an under side of the liquid discharge port, from which the liquid is discharged, of the liquid provider, an under side of the solid discharge port, from which the powder or the granule is discharged, of the solid provider, and an above side of the stand.

20. The beverage producing apparatus according to claim 1, wherein
- the lid holder includes a lid holding part having a groove-shaped cross section,
- the groove shape of the lid holding part includes an upper surface, a lower surface, and a connection surface connecting the upper surface and the lower surface,
- the upper surface is positioned above the lower surface in a state in which the lid is positioned on an above side of the bottle, and
- a width, in a direction extending from the connection surface, of the upper surface is larger than a width, in a direction extending from the connection surface, of the lower surface.

* * * * *